United States Patent
Song et al.

(10) Patent No.: US 9,633,780 B2
(45) Date of Patent: Apr. 25, 2017

(54) APPARATUS AND METHOD FOR CONTROLLING RESONATOR OF WIRELESS POWER TRANSMISSION SYSTEM

(71) Applicant: Samsung Electronics Co., Ltd., Suwon-si (KR)

(72) Inventors: KeumSu Song, Seoul (KR); Sang Wook Kwon, Seongnam-si (KR); Ki Young Kim, Yongin-si (KR); Nam Yun Kim, Seoul (KR); Dong Zo Kim, Yongin-si (KR); Yun Kwon Park, Dongducheon-si (KR); Chi Hyung Ahn, Suwon-si (KR); Young Ho Ryu, Yongin-si (KR); Chang Wook Yoon, Seoul (KR); Jin Sung Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 712 days.

(21) Appl. No.: 14/023,758

(22) Filed: Sep. 11, 2013

(65) Prior Publication Data

US 2014/0077613 A1  Mar. 20, 2014

(30) Foreign Application Priority Data

Sep. 11, 2012  (KR) ........................ 10-2012-0100450

(51) Int. Cl.
*H01F 27/42*  (2006.01)
*H01F 37/00*  (2006.01)
(Continued)

(52) U.S. Cl.
CPC ............ *H01F 38/14* (2013.01); *B60L 11/182* (2013.01); *B60L 11/1833* (2013.01); *H02J 5/005* (2013.01);
(Continued)

(58) Field of Classification Search
CPC ... H02J 5/005; H02J 17/00; H02J 5/00; G06F 9/54; G06F 9/00; H01Q 1/243; H01Q 1/244
(Continued)

(56) References Cited

U.S. PATENT DOCUMENTS 5,939,883 A * 8/1999 Green .............. G01R 33/34061
324/318
8,799,435 B2 * 8/2014 Sueyoshi .................. G06F 9/54
709/200
(Continued)

FOREIGN PATENT DOCUMENTS

JP          2012-23949 A     2/2012
KR     10-2010-0026075 A    3/2010
(Continued)

*Primary Examiner* — Fritz M Fleming
*Assistant Examiner* — Jagdeep Dhillon
(74) *Attorney, Agent, or Firm* — NSIP Law

(57) ABSTRACT

A source device configured to transmit a magnetic field via magnetic resonance with a target device includes a source resonator including a plurality of loop circuits respectively configured to generate different magnetic fields each depending on a length of a corresponding one of the plurality of loop circuits, and a circuit selector configured to select one loop circuit among the plurality of loop circuits based on information associated with the target device.

26 Claims, 27 Drawing Sheets

(51) Int. Cl.
*H01F 38/00* (2006.01)
*H01F 38/14* (2006.01)
*H04B 1/69* (2011.01)
*H02J 5/00* (2016.01)
*H04B 5/00* (2006.01)
*B60L 11/18* (2006.01)
*H02J 7/02* (2016.01)

(52) U.S. Cl.
CPC .............. *H04B 1/69* (2013.01); *H04B 5/0012* (2013.01); *H04B 5/0037* (2013.01); *B60L 2210/10* (2013.01); *B60L 2210/30* (2013.01); *B60L 2210/40* (2013.01); *H02J 7/025* (2013.01); *Y02T 10/7005* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
USPC .................. 307/104, 149, 66, 64, 82, 80, 43; 375/130; 343/846, 848
See application file for complete search history.

(56) References Cited

U.S. PATENT DOCUMENTS

| | | |
|---|---|---|
| 2003/0044017 A1 | 3/2003 | Briscoe |
| 2010/0034238 A1* | 2/2010 | Bennett .................. H02J 5/005 375/130 |
| 2011/0241618 A1 | 10/2011 | Karalis et al. |
| 2012/0025631 A1* | 2/2012 | Shionoiri ................ H02J 17/00 307/149 |
| 2012/0242557 A1* | 9/2012 | Anguera ................ H01Q 1/243 343/848 |
| 2013/0038402 A1* | 2/2013 | Karalis .................. H02J 5/005 333/32 |

FOREIGN PATENT DOCUMENTS

| | | |
|---|---|---|
| KR | 10-2010-0055068 A | 5/2010 |
| KR | 10-2011-0004321 A | 1/2011 |
| KR | 10-2011-0049659 A | 5/2011 |
| KR | 10-2011-0050697 A | 5/2011 |
| KR | 10-2011-0122394 A | 11/2011 |

* cited by examiner

APPARATUS AND METHOD FOR CONTROLLING RESONATOR OF WIRELESS POWER TRANSMISSION SYSTEM

CROSS-REFERENCE TO RELATED APPLICATIONS

This application claims the benefit under 35 USC 119(a) of Korean Patent Application No. 10-2012-0100450 filed on Sep. 11, 2012, in the Korean Intellectual Property Office, the entire disclosure of which is incorporated herein by reference for all purposes.

BACKGROUND

1. Field

The following description relates to an apparatus and method for controlling a resonator of a wireless power transmission system to change a magnitude of a magnetic field generated or received by the resonator and an input impedance.

2. Description of Related Art

Wireless power is energy that is transmitted from a wireless power transmitter to a wireless power receiver via magnetic coupling. Accordingly, a wireless power transmission system includes a source device configured to wirelessly transmit power, and a target device configured to wirelessly receive power. The source device may be referred to as a wireless power transmitter, and the target device may be referred to as a wireless power receiver.

The source device includes a source resonator, and the target device includes a target resonator. Magnetic coupling or resonance coupling occur between the source resonator and the target resonator.

Since a magnitude of a magnetic field generated by the source resonator and a magnitude of a magnetic field received by the target resonator is fixed, a number of source devices corresponding to a plurality of target devices is necessary for the plurality of target devices to receive power.

SUMMARY

In one general aspect, a source device configured to transmit a magnetic field via magnetic resonance with a target device includes a source resonator including a plurality of loop circuits respectively configured to generate different magnetic fields each depending on a length of a corresponding one of the plurality of loop circuits; and a circuit selector configured to select one loop circuit among the plurality of loop circuits based on information associated with the target device.

The source resonator may further include a plurality of capacitors respectively corresponding to the plurality of loop circuits; and a plurality of first switches respectively corresponding to the plurality of loop circuits and each configured to connect a corresponding one of the plurality of capacitors to a corresponding one of the plurality of loop circuits.

The circuit selector may be further configured to control the first switch corresponding to the selected loop circuit to connect the capacitor corresponding to the selected loop circuit to the selected loop circuit to cause the selected loop circuit to generate a magnetic field corresponding to the selected loop circuit.

Each of the plurality of capacitors may have a capacitance determined based on the length of the loop circuit to which the capacitor corresponds.

The circuit selector may be further configured to determine a magnitude of a magnetic field to be generated by the source resonator based on the information associated with the target device; and select the one loop circuit among the plurality of loop circuits based on the determined magnitude of the magnetic field.

The information associated with the target device may include distance information of a distance between the target device and the source device; and the circuit selector may be further configured to determine the magnitude of the magnetic field to be generated by the source resonator based on the information of the distance between the target device and the source device.

The information associated with the target device may include magnitude information of a magnetic field to be received by the target device; and the circuit selector may be further configured to determine the magnitude of the magnetic field to be generated by the source resonator based on the magnitude information of the magnetic field to be received by the target device.

The source resonator may include a plurality of second switches respectively corresponding to the plurality of loop circuits and each configured to supply a power to a corresponding one of the plurality of loop circuits.

The circuit selector may be further configured to select a loop circuit to be used as a feeder among the plurality of loop circuits based on an input impedance of the target device; and control the second switch corresponding to the selected loop circuit to supply the power to the selected loop circuit.

The source device may further include a communication unit configured to receive either one or both of the information associated with the target device and information associated with a relay device by communicating with either one or both of the target device and the relay device.

The circuit selector may be further configured to select either the target device or the relay device to receive a magnetic field transmitted by the source device based on the received information; and select the one loop circuit among the plurality of loop circuits based on a result of the selecting of either the target device or the relay device.

The information associated with the relay device may include any one or any combination of distance information of a distance between the relay device and the source device, information associated with the target device to which the relay device relays the magnetic field, and input impedance information of the relay device.

The circuit selector may be further configured to determine a magnetic field transmission efficiency for each of the target device and the relay device based on the received information; and select either the target device or the relay device based on the determined magnetic field transmission efficiencies.

In another general aspect, a target device configured to receive a magnetic field via magnetic resonance with a source device includes a target resonator including a plurality of loop circuits respectively configured to receive different magnetic fields each depending on a length of a corresponding one of the plurality of loop circuits; and a circuit selector configured to select one loop circuit among the plurality of loop circuits based on information associated with the source device.

The target resonator may include a plurality of capacitors respectively corresponding to the plurality of loop circuits; and a plurality of first switches respectively corresponding to the plurality of loop circuits and each configured to connect a corresponding one of the plurality of capacitors to a corresponding one of the plurality of loop circuits.

The information associated with the source device may include distance information of a distance between the source device and the target device; and the circuit selector may be further configured to select the one loop circuit among the plurality of loop circuits based on the distance information of the distance between the source device and the target device.

The information associated with the source device may include magnitude information of a magnetic field generated by the source device; and the circuit selector may be further configured to select the one loop circuit among the plurality of loop circuits based on the magnitude information of the magnetic field generated by the source device.

The target resonator may include a plurality of second switches respectively corresponding to the plurality of loop circuits and each configured to supply a power generated by the target resonator to a corresponding one of the plurality of loop circuits.

The circuit selector may be further configured to select a loop circuit to be used as a feeder among the plurality of loop circuits based on an input impedance of the source device; and control the second switch corresponding to the selected loop circuit to supply the power generated by the target resonator to the selected loop circuit.

The target device may further include a communication unit configured to receive either one or both of the information associated with the source device and information associated with a relay device by communicating with either one or both of the source device and the relay device.

The circuit selector may be further configured to select either the source device or the relay device as a device from which the target device is to receive a magnetic field based on the received information; and select one loop circuit among the plurality of loop circuits based on a result of the selecting of either the source device or the relay device.

The circuit selector may be further configured to determine a magnetic field reception efficiency for each of the source device and the relay device based on the received information; and select either the source device or the relay device based on the determined magnetic field reception efficiencies.

In another general aspect, a relay device configured to relay a magnetic field received from a source device to a target device via magnetic resonance with the source device includes a relay resonator including a plurality of loop circuits respectively configured to relay different magnetic fields each depending on a length of a corresponding one of the plurality of loop circuits; and a circuit selector configured to select one loop circuit among the plurality of loop circuits based on information associated with the source device and information associated with the target device.

The relay resonator may include a plurality of capacitors respectively corresponding to the plurality of loop circuits; and a plurality of first switches respectively corresponding to the plurality of loop circuits and each configured to connect a corresponding one of the plurality of capacitors to a corresponding one of the plurality of loop circuits.

The circuit selector may be further configured to control the first switch corresponding to the selected loop circuit to connect the capacitor corresponding to the selected loop circuit to the selected loop circuit to cause the selected loop circuit to relay a magnetic field corresponding to the selected loop circuit.

In another general aspect, a method of operating a source device configured to transmit a magnetic field via magnetic resonance with a target device, the source device including a source resonator including a plurality of loop circuits, includes selecting one loop circuit among the plurality of loop circuits of the source resonator based on information associated with the target device; and generating a magnetic field corresponding to a length of the selected loop circuit.

In another general aspect, a non-transitory computer readable storage medium stores a program for controlling a computer to perform the method described above.

In another general aspect, a method of operating a target device configured to receive a magnetic field via magnetic resonance with a source device, the target device including a target resonator including a plurality of loop circuits, includes selecting one loop circuit among the plurality of loop circuits of the target resonator based on information associated with the source device; and receiving a magnetic field corresponding to a length of the selected loop circuit.

In another general aspect, a method of operating a relay device configured to relay to a target device a magnetic field received by the relay device via magnetic resonance with a source device, the relay device including a relay resonator including a plurality of loop circuits, includes selecting one loop circuit among the plurality of loop circuits of the relay resonator based on information associated with the source device and the target device; and relaying a magnetic field corresponding to a length of the selected loop circuit.

In another general aspect, a source device configured to transmit a magnetic field via magnetic resonance with a target device includes a source resonator configured to generate a magnetic field and having at least one controllable parameter affecting a wireless power transmission efficiency; and a controller configured to control the at least one controllable parameter of the source resonator based on information associated with the target device.

The at least one controllable parameter may include either one or both of an input impedance of the source resonator and a magnitude of the magnetic field generated by the source resonator.

Other features and aspects will be apparent from the following detailed description, the drawings, and the claims.

DETAILED DESCRIPTION

Figure 1:
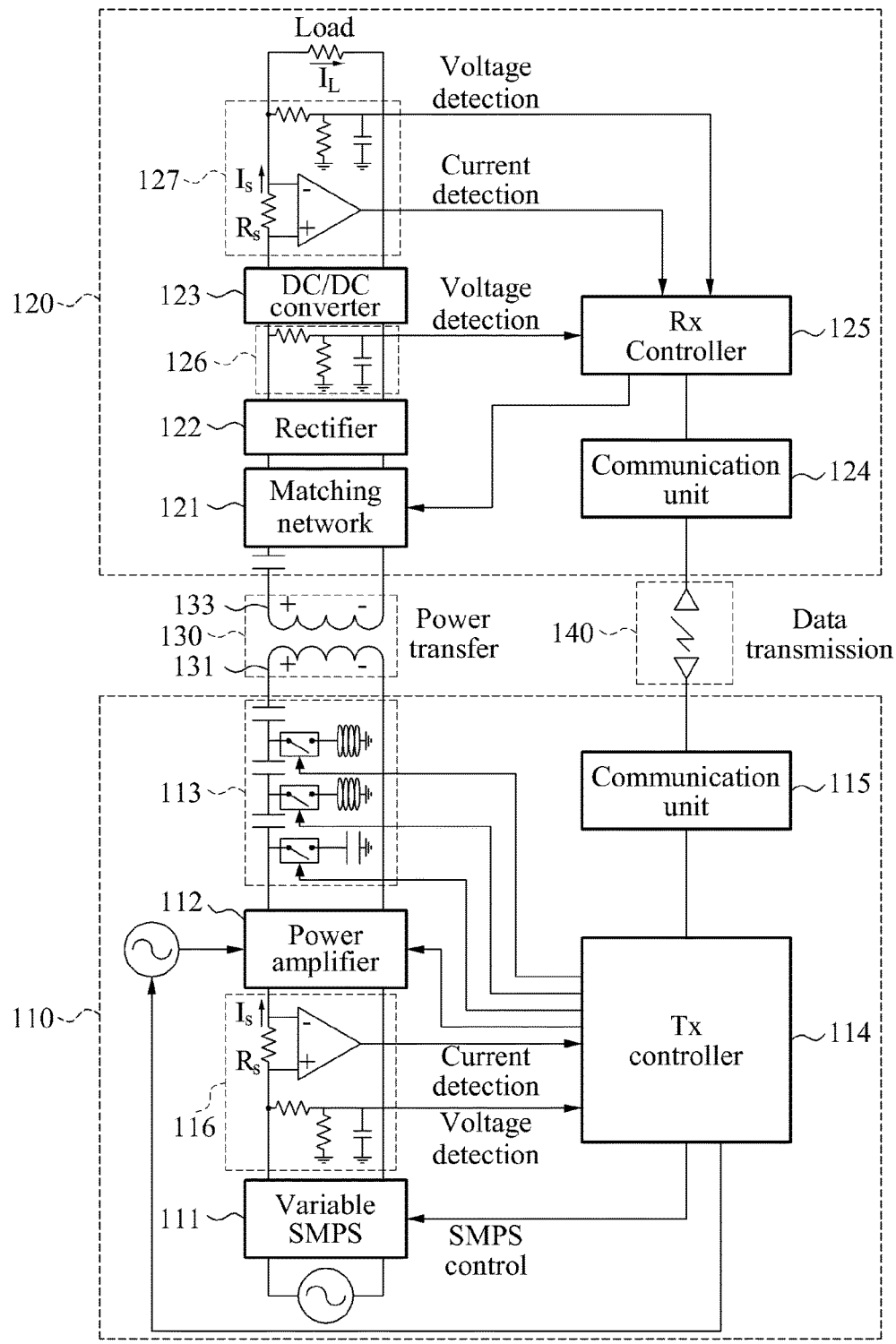
FIG. 1 illustrates an example of a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Communication between a source and a target may be performed using either one or both of in-band communication and out-of-band communication. In-band communication is communication between a source and a target using a frequency that is the same as a frequency used for power transmission. Out-of-band communication is communication between a source and a target using a frequency that is different from a frequency used for power transmission.

FIG. 1 illustrates an example of a wireless power transmission system. Referring to FIG. 1, the wireless power transmission system includes a source device 110 and a target device 120. The source device 110 is a device configured to supply wireless power, and may be any electronic device capable of supplying power, for example, a pad, a terminal, a tablet personal computer (PC), a television (TV), a medical device, or an electric vehicle. The target device 120 is a device configured to receive wireless power, and may be any electronic device requiring power to operate, for example, a pad, a terminal, a tablet PC, a TV, a medical device, an electric vehicle, a washing machine, a radio, or a lighting system.

The source device 110 includes a variable switching mode power supply (SMPS) 111, a power amplifier (PA) 112, a matching network 113, a transmission (TX) controller 114 (for example, TX control logic), a communication unit 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a DC voltage having a predetermined level, or may output a DC voltage having a voltage that may be adjusted under control of the TX controller 114.

The power detector 116 detects an output current and an output voltage of the variable SMPS 111, and provides information about the detected current and the detected voltage to the TX controller 114. Additionally, the power detector 116 may detect an input current and an input voltage of the PA 112.

The PA 112 generates power by converting the DC voltage having a predetermined level to an AC using a switching pulse signal having a frequency in a band of a few megahertz (MHz) to tens of MHz. For example, the PA 112 may convert the DC voltage supplied to the PA 112 to an AC voltage having a reference resonant frequency $F_{Ref}$, and may generate a communication power used for communication, and/or a charging power used for charging. The communication power and the charging power may be used in target devices.

The communication power may be a low power of 0.1 milliwatt (mW) to 1 mW. The charging power may be a high power of 1 mW to 200 W that is consumed by a device load of a target device. As used herein, the term "charging" may refer to supplying power to an element or a unit that is configured to charge a battery or other rechargeable device. Also, the term "charging" may refer supplying power to an element or a unit that is configured to consume power. For example, the term "charging power" may refer to power consumed by a target device while operating, or power used to charge a battery of the target device. The unit or the element may be, for example, a battery, a display device, a sound output circuit, a main processor, or any of various types of sensors.

Further, as used herein, the term "reference resonant frequency" refers to a resonant frequency that is nominally used by the source device 110, and the term "tracking frequency" refers to a resonant frequency used by the source device 110 that has been adjusted based on a predetermined scheme.

The TX controller 114 may detect a reflected wave of the communication power or the charging power, and may detect mismatching that may occur between a target resonator 133 and a source resonator 131 based on the detected reflected wave. The TX controller 114 may detect the mismatching by detecting an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the TX controller 114. The matching network 113 includes at least one inductor and at least one capacitor each connected to a respective switch controlled by the TX controller 114.

The TX controller 114 may calculate a voltage standing wave ratio (VSWR) based on a voltage level of the reflected wave and a level of an output voltage of the source resonator 131 or the PA 112. In one example, if the VSWR is greater than a predetermined value, the TX controller 114 may determine that mismatching is detected.

In another example, if the VSWR is greater than the predetermined value, the TX controller 114 may calculate a wireless power transmission efficiency for each of N tracking frequencies, determine a tracking frequency $F_{Best}$ having the best power transmission efficiency among the N tracking frequencies, and adjust the reference resonant frequency $F_{Ref}$ to the tracking frequency $F_{Best}$. The N tracking frequencies may be set in advance.

The TX controller 114 may adjust a frequency of the switching pulse signal used by the PA 112. The frequency of the switching pulse signal may be determined under the control of the TX controller 114. For example, by controlling the PA 112, the TX controller 114 may generate a modulated signal to be transmitted to the target device 120. That is, the TX controller 114 may transmit a variety of data to the target device 120 using in-band communication. Additionally, the TX controller 114 may detect a reflected wave, and may demodulate a signal received from the target device 120 from an envelope of the reflected wave.

The TX controller 114 may generate the modulated signal for the in-band communication using various methods. For example, the TX controller 114 may generate the modulated signal by turning the switching pulse signal used by the PA 112 ON and OFF, by performing delta-sigma modulation, or by any other modulation method known to one of ordinary skill in the art. Additionally, the TX controller 114 may generate a pulse-width modulated (PWM) signal having a predetermined envelope.

The communication unit 115 performs out-of-band communication using a separate communication channel. The communication unit 115 may include a communication module, such as a ZigBee module, a Bluetooth module, or any other communication module known to one of ordinary skill in the art. module, that the communication unit 115 may use to perform the out-of-band communication. The communication unit 115 may transmit or receive data 140 to or from the target device 120 via the out-of-band communication.

The source resonator 131 transmits electromagnetic energy 130, such as the communication power and/or the charging power, to the target resonator 133 via a magnetic coupling with the target resonator 133.

The target device 120 includes a matching network 121, a rectifier 122, a DC/DC converter 123, a communication unit 124, a reception (RX) controller 125 (for example, RX control logic), a voltage detector 126, and a power detector 127.

The target resonator 133 receives the electromagnetic energy 130 from the source resonator 131. For example, the target resonator 133 may receive the communication power and/or the charging power via a magnetic coupling with the source resonator 131. Additionally, the target resonator 133 may receive data from the source device 110 via the in-band communication.

The matching network 121 matches an input impedance viewed from the source device 110 to an output impedance viewed from a load of the target device 120. The matching network 121 may be configured to have at least one capacitor and at least one inductor.

The rectifier 122 generates DC voltage by rectifying an AC voltage received from the target resonator 133.

The DC/DC converter 123 may adjust a level of the DC voltage output from the rectifier 122 based on a capacity required by the load. For example, the DC/DC converter 123 may adjust the level of the DC voltage output from the rectifier 122 to a level in a range from 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal is used to calculate a wireless power transmission efficiency of the power received from the source device 110. The detected current and the detected voltage of the output terminal may be used by the RX controller 125 to calculate an amount of a power actually transferred to the load. The TX controller 114 of the source device 110 may calculate an amount of a power that needs to be transmitted by the source device 110 to the target device 120 based on a power required by the load and the power actually transferred to the load.

If the amount of the power actually transferred to the load calculated by the RX controller 125 is transmitted to the source device 110 by the communication unit 124, the source device 110 may calculate the amount of power that needs to be transmitted to the target device 120.

The RX controller 125 may perform in-band communication to transmit and receive data using a resonant frequency. During the in-band communication, the RX controller 125 may demodulate a received signal by detecting a signal between the target resonator 133 and the rectifier 122, or detecting an output signal of the rectifier 122, and demodulating the detected signal. That is, the RX controller 125 may demodulate a message received via the in-band communication.

Additionally, the RX controller 125 may adjust an input impedance of the target resonator 133 using the matching network 121 to modulate a signal to be transmitted to the source device 110. For example, the RX controller 125 may adjust the matching unit 121 to increase the input impedance of the target resonator 133 so that a reflected wave will be detected by the TX controller 114 of the source device 110. Depending on whether the reflected wave is detected, the TX controller 114 of the source device 110 may detect a first value, for example, a binary number "0," or a second value, for example, a binary number "1". For example, when the reflected wave is detected, the TX controller 114 may detect "0", and when the reflected wave is not detected, the TX controller 114 may detect "1". Alternatively, when the reflected wave is detected, the TX controller 114 may detect "1", and when the reflected wave is not detected, the TX controller 114 may detect "0".

The communication unit 124 of the target device 120 may transmit a response message to the communication unit 115 of the source device 110. For example, the response message may include any one or any combination of a product type of the target device 120, manufacturer information of the target device 120, a product model name of the target device 120, a battery type of the target device 120, a charging scheme of the target device 120, an impedance value of a load of the target device 120, information about a characteristic of a target resonator of the target device 120, information about a frequency band used by the target device 120, an amount of power to be used by the target device 120, an identifier (ID) of the target device 120, product version information of the target device 120, standard information of the target device 120, and any other information about the target device 120.

The communication unit 124 performs out-of-band communication using a separate communication channel. For example, the communication unit 124 may include a communication module, such as a ZigBee module, a Bluetooth module, or any other communication module known to one of ordinary skill in the art, that the communication unit 124 may use to transmit and receive data to and from the source device 110 via the out-of-band communication.

The communication unit 124 may receive a wake-up request message from the source device 110, and the power detector 127 may detect an amount of a power received by the target resonator 133. The communication unit 124 may transmit to the source device 110 information about the detected amount of the power received by the target resonator 133. The information about the detected amount of the power received by the target resonator 133 may include, for example, an input voltage value and an input current value of the rectifier 122, an output voltage value and an output current value of the rectifier 122, an output voltage value and an output current value of the DC/DC converter 123, and any other information about the detected amount of the power received by the target resonator 133.

The TX controller 114 may set a resonance bandwidth of the source resonator 131. Based on the setting of the resonance bandwidth of the source resonator 131, a Q-factor $Q_S$ of the source resonator 131 may be determined. For example, the TX controller 114 may set the resonance bandwidth of the source resonator 131 to be wider or narrower than the resonance bandwidth of the target resonator 133.

Additionally, the RX controller 125 may set a resonance bandwidth of the target resonator 133. Based on the setting of the resonance bandwidth of the target resonator 133, a Q-factor of the target resonator 133 may be determined. For example, the RX controller 125 may set the resonance bandwidth of the target resonator 133 to be wider or narrower than the resonance bandwidth of the source resonator 131.

The source device 110 and the target device 120 communicate with each other to share information about the resonance bandwidth of the source resonator 131 and the resonance bandwidth of the target resonator 133. In an example in which a power desired or required by the target device 120 is greater than a reference value, the Q-factor $Q_S$ of the source resonator 131 may be set to a value greater than 100. In another example in which the power desired or required by the target device 120 is lower than the reference value, the Q-factor $Q_S$ of the source resonator 131 may be set to a value less than 100.

In resonance-type wireless power transmission, the resonance bandwidth may be an important factor. A Q-factor Qt of energy coupling between the source resonator 131 and the target resonator 133 is affected by a change in a distance between the source resonator 131 and the target resonator 133, a change in a resonance impedance, impedance mismatching, a reflected signal, or any other factor affecting a Q-factor. Qt is inversely proportional to the resonance bandwidth as expressed by the following Equation 1:

$$\frac{\Delta_f}{f_0} = \frac{1}{Qt}$$
$$= \Gamma_{S,D} + \frac{1}{BW_S} + \frac{1}{BW_D}$$
(1)

In Equation 1, $f_0$ denotes a center frequency, $\Delta f$ denotes a bandwidth, $\Gamma_{S,D}$ denotes a reflection loss between the source resonator 131 and the target resonator 133, $BW_S$ denotes a resonance bandwidth of the source resonator 131, and $BW_D$ denotes a resonance bandwidth of the target resonator 133.

A wireless power transmission efficiency U of the wireless power transmission may be expressed by the following Equation 2:

$$U = \frac{k}{\sqrt{\Gamma_S \Gamma_D}} = \frac{\omega_0 M}{\sqrt{R_S R_D}} = \frac{\sqrt{Q_S Q_D}}{Q_k}$$
(2)

In Equation 2, κ denotes a coupling coefficient of energy coupling between the source resonator 131 and the target resonator 133, $\Gamma_S$ denotes a reflection coefficient of the source resonator 131, $\Gamma_D$ denotes a reflection coefficient of the target resonator 133, $\omega_0$ denotes a resonant frequency of the source resonator 131 and the target resonator 133, M denotes a mutual inductance between the source resonator 131 and the target resonator 133, $R_S$ denotes an impedance of the source resonator 131, $R_D$ denotes an impedance of the target resonator 133, $Q_S$ denotes a Q-factor of the source resonator 131, $Q_D$ denotes a Q-factor of the target resonator 133, and $Q_K$ denotes a Q-factor of the energy coupling between the source resonator 131 and the target resonator 133, and is the same as Qt discussed above in connection with Equation 1.

As can be seen from Equation 2, the Q-factors $Q_S$ and $Q_D$ have a great effect on the wireless power transmission efficiency U. Accordingly, to increase the wireless power transmission efficiency U, the Q-factors $Q_S$ and $Q_D$ may be set to high values. However, even when the Q-factors $Q_S$ and $Q_D$ are set to extremely high values, the wireless power transmission efficiency U may be reduced due to a change in the coupling coefficient κ of energy coupling, the change in distance between the source resonator 131 and the target resonator 133, the change in the resonance impedance, impedance mismatching, or a change in any other factor affecting the wireless power transmission efficiency U.

If the resonance bandwidths $BW_S$ and $BW_D$ of the source resonator 131 and the target resonator 133 are set to be very narrow to increase the wireless power transmission efficiency U, impedance mismatching between the source resonator 131 and the target resonator 133 may easily occur due to even a small external influence. In terms of impedance mismatching, Equation 1 may be rewritten as the following Equation 3:

$$\frac{\Delta_f}{f_0} = \frac{\sqrt{VSWR} - 1}{Qt\sqrt{VSWR}}$$
(3)

In an example in which an unbalanced relationship of a resonance bandwidth or a bandwidth of an impedance matching frequency between the source resonator 131 and the target resonator 133 is maintained, a decrease in the wireless power transmission efficiency may be prevented. The decrease in the wireless transmission efficiency may be a result of a change in the coupling coefficient κ of energy coupling, a change in the distance between the source resonator 131 and the target resonator 133, a change in the resonance impedance, impedance mismatching, or any other factor affecting the wireless power transmission efficiency.

Based on Equations 1 and 3, an unbalanced relationship between the Q-factors $Q_S$ and $Q_D$ may be maintained in an example in which the unbalanced relationship of the resonance bandwidth or the bandwidth of the impedance matching frequency between the source resonator 131 and the target resonator 133 is maintained.

In FIG. 1, the source device 110 may wirelessly transmit a wake-up power signal to wake up the target device 120, and may broadcast a configuration signal to configure a wireless power transmission network. The source device 110 may receive a search frame including a reception sensitivity of the configuration signal in the target device 120 from the target device 120, allow the target device 120 to join the wireless power transmission network, and transmit an ID identifying the target device 120 in the wireless power transmission network to the target device 120. The source device 110 may generate a charging power through power control, and may wirelessly transmit the charging power to the target device 120.

The target device 120 may receive a wake-up power signal from at least one of the plurality of source devices, and activate a communication function using the wake-up power signal. The target device 120 may receive a configuration signal to configure a wireless power transmission network from each of the plurality of source devices, select one of the plurality of source devices, such as the source device 110 in FIG. 1, based on a reception sensitivity of the configuration signal in the target device 120, and wirelessly receive power from the selected source device 110.

In the following description of FIGS. 2A, 2B, 3A, 3B, 4A, and 4B, unless otherwise indicated, the term "resonator" may refer to both a source resonator and a target resonator.

Figure 2A:
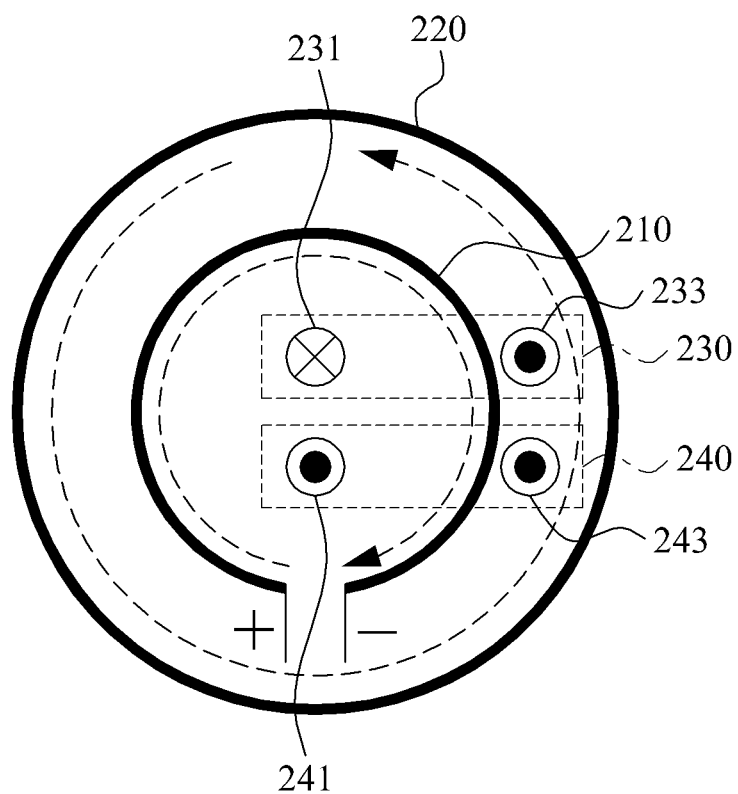
FIGS. 2A and 2B illustrate examples of a distribution of a magnetic field in a feeder and a resonator of a wireless power transmitter.
Figure 2B:
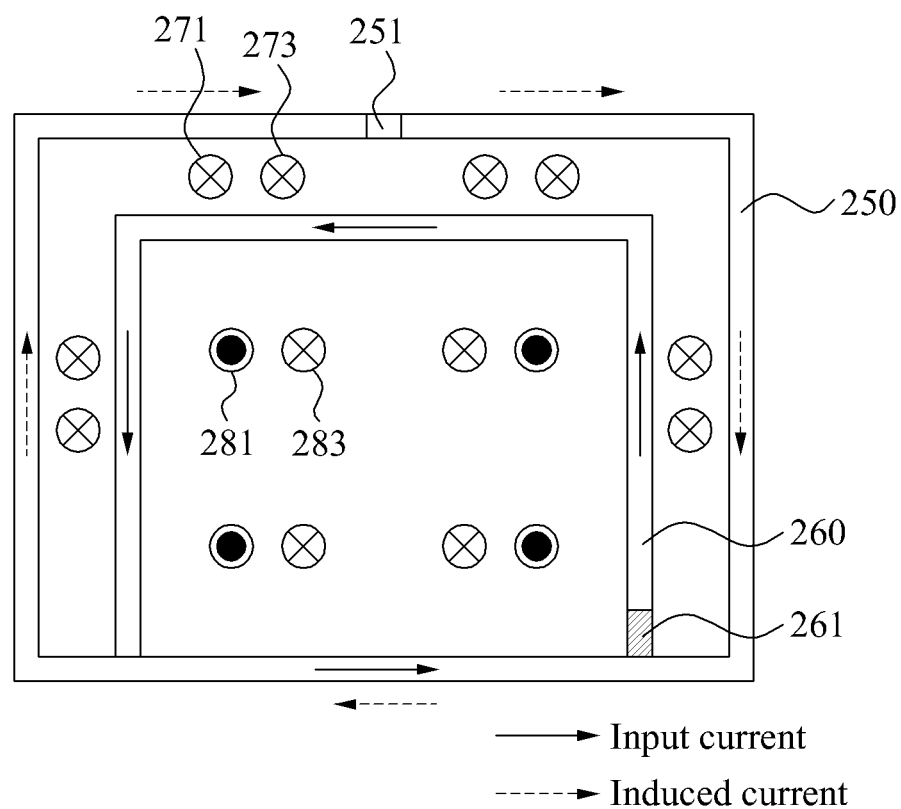

FIGS. 2A and 2B illustrate examples of a distribution of a magnetic field in a feeder and a resonator of a wireless power transmitter. When a resonator receives power supplied through a separate feeder, magnetic fields are formed in both the feeder and the resonator.

FIG. 2A is a diagram illustrating an example of a structure of a wireless power transmitter in which a feeder 210 and a resonator 220 do not have a common ground. Referring to FIG. 2A, when an input current flows into the feeder 210 through a terminal labeled "+" and out of the feeder 210 through a terminal labeled "−", a magnetic field 230 is generated by the input current. A direction 231 of the magnetic field 230 inside the feeder 210 is into the plane of FIG. 2A, and is opposite to a direction 233 of the magnetic field 230 outside the feeder 210. The magnetic field 230 generated by the feeder 210 induces a current to flow in the resonator 220. The direction of the induced current in the resonator 220 is opposite to a direction of the input current in the feeder 210 as indicated by the dashed lines with arrowheads in FIG. 2A.

The induced current in the resonator 220 generates a magnetic field 240. Directions of the magnetic field 240 generated by the resonator 220 are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 230 generated by the feeder 210 and the magnetic field 240 generated by the resonator 220 are combined, a strength of the total magnetic field inside the feeder 210 decreases inside the feeder 210, but increases outside the feeder 210. In an example in which power is supplied to the resonator 220 through the feeder 210 configured as illustrated in FIG. 2A, the strength of the total magnetic field decreases in the center of the resonator 220, but increases outside the resonator 220. In another example in which a magnetic field is randomly or not uniformly distributed in the resonator 220, performing impedance matching is difficult since an input impedance will vary frequently. Additionally, when the strength of the total magnetic field increases, the wireless power transmission efficiency increases. Conversely, when the strength of the total magnetic field decreases, the wireless power transmission efficiency decreases. Accordingly, the wireless power transmission efficiency is reduced on average when the magnetic field is randomly or not uniformly distributed in the resonator 220 compared to when the magnetic field is uniformly distributed in the resonator 220.

FIG. 2B illustrates an example of a structure of a wireless power transmitter in which a source resonator 250 and a feeder 260 have a common ground. The source resonator 250 includes a capacitor 251. The feeder 260 receives a radio frequency (RF) signal via a port 261. When the RF signal is input to the feeder 260, an input current is generated in the feeder 260. The input current flowing in the feeder 260 generates a magnetic field, and a current is induced in the source resonator 250 by the magnetic field. Additionally, another magnetic field is generated by the induced current flowing in the source resonator 250. In this example, a direction of the input current flowing in the feeder 260 is opposite to a direction of the induced current flowing in the source resonator 250. Accordingly, in a region between the source resonator 250 and the feeder 260, a direction 271 of the magnetic field generated by the input current is the same as a direction 273 of the magnetic field generated by the induced current, and thus the strength of the total magnetic field increases in the region between the source resonator 250 and the feeder 260. Conversely, inside the feeder 260, a direction 281 of the magnetic field generated by the input current is opposite to a direction 283 of the magnetic field generated by the induced current, and thus the strength of the total magnetic field decreases inside the feeder 260. Therefore, the strength of the total magnetic field decreases in the center of the source resonator 250, but increases outside the source resonator 250.

An input impedance may be adjusted by adjusting an internal area of the feeder 260. The input impedance refers to an impedance viewed in a direction from the feeder 260 to the source resonator 250. When the internal area of the feeder 260 is increased, the input impedance is increased. Conversely, when the internal area of the feeder 260 is decreased, the input impedance is decreased. However, if the magnetic field is randomly or not uniformly distributed in the source resonator 250, a value of the input impedance may vary based on a location of a target device even if the internal area of the feeder 260 has been adjusted to adjust the input impedance to match an output impedance of a power amplifier for a specific location of the target device. Accordingly, a separate matching network may be required to match the input impedance to an output impedance of the power amplifier. For example, when the input impedance is increased, a separate matching network may be used to match the increased input impedance to a relatively low output impedance of the power amplifier.

In an example in which a target resonator has the same configuration as the source resonator 250, and a feeder of the target resonator has the same configuration as the feeder 260 of the source resonator 250, a separate matching network may still be required because a direction of a current flowing in the target resonator will be opposite to a direction of an induced current flowing in the feeder of the target resonator.

Figure 3A:
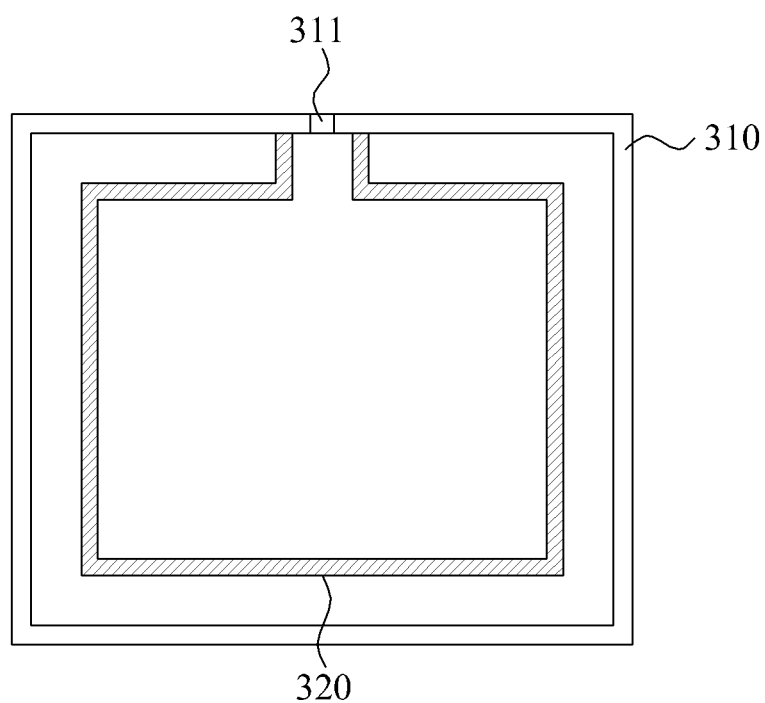
FIGS. 3A and 3B illustrate an example of a resonator and a feeder of a wireless power transmitter.
Figure 3B:
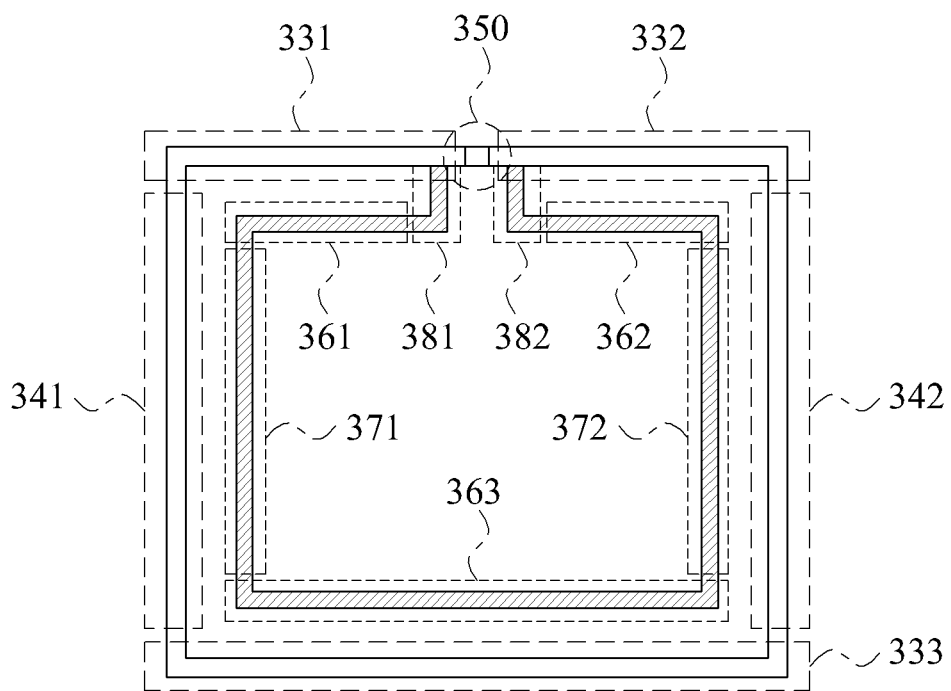

FIGS. 3A and 3B illustrates an example of a resonator and a feeder of a wireless power transmitter. Referring to FIG. 3A, the wireless power transmitter includes a resonator 310 and a feeder 320. The resonator 310 includes a capacitor 311. The feeder 320 is electrically connected to both ends of the capacitor 311.

FIG. 3B illustrates in greater detail a structure of the wireless power transmitter of FIG. 3A. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is inserted in series between a first signal conducting portion 331 and a second signal conducting portion 332, causing an electric field to be concentrated in the capacitor 350. Generally, a transmission line includes at least one conductor in an upper portion of the transmission line, and at least one conductor in a lower portion of the transmission line. A current may flow through the at least one conductor disposed in the upper portion of the transmission line, and the at least one conductor disposed in the lower portion of the transmission line may be electrically grounded. In this example, a conductor disposed in an upper portion of the first transmission line in FIG. 3B is separated into two portions that will be referred to as the first signal conducting portion 331 and the second signal conducting portion 332. A conductor disposed in a lower portion of the first transmission line in FIG. 3B will be referred to as a first ground conducting portion 333.

As illustrated in FIG. 3B, the resonator 310 has a generally two-dimensional (2D) structure. The first transmission line includes the first signal conducting portion 331 and the second signal conducting portion 332 in the upper portion of the first transmission line, and includes the first ground conducting portion 333 in the lower portion of the first transmission line. The first signal conducting portion 331 and the second signal conducting portion 332 are disposed to face the first ground conducting portion 333. A current flows through the first signal conducting portion 331 and the second signal conducting portion 332.

One end of the first signal conducting portion 331 is connected to one end of the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the first ground conducting portion 333. Accordingly, the first signal conducting portion 331, the second signal conducting portion 332, the first ground conducting portion 333, the first conductor 341, and the second conductor 342 are connected to each other, causing the resonator 310 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted into a space between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zigzagged conductor lines and a dielectric material having a relatively high permittivity disposed between the zigzagged conductor lines.

The capacitor 350 inserted into the first transmission line may cause the resonator 310 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the magnetic permeability of the metamaterial and a sign of the permittivity of the metamaterial.

If the capacitor 350 is a lumped element capacitor and a capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth order resonance characteristic at the target frequency, and any other suitable criterion. Based on any one or any combination of the aforementioned criteria, the capacitance of the capacitor 350 may be appropriately determined.

The resonator 310, hereinafter referred to as the MNG resonator 310, may have a zeroth order resonance characteristic of having a resonant frequency when a propagation constant is "0". When the MNG resonator 310 has the zeroth order resonance characteristic, the resonant frequency is independent of a physical size of the MNG resonator 310. By changing the capacitance of the capacitor 350, the resonant frequency of the MNG resonator 310 may be changed without changing the physical size of the MNG resonator 310.

In a near field, the electric field is concentrated in the capacitor 350 inserted into the first transmission line, causing the magnetic field to become dominant in the near field. The MNG resonator 310 has a relatively high Q-factor when the capacitor 350 is a lumped element capacitor, thereby increasing a wireless power transmission efficiency. The Q-factor indicates a level of an ohmic loss or a ratio of a reactance with respect to a resistance in the wireless power transmission. As will be understood by one of ordinary skill in the art, the wireless power transmission efficiency will increase as the Q-factor increases.

Although not illustrated in FIG. 3B, a magnetic core passing through the MNG resonator 310 may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 in an upper portion of the second transmission line, and includes a second ground conducting portion 363 in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

One end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel with both ends of the capacitor 350. The fifth conductor 381 and the sixth conductor 382 are used as an input port to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, causing the resonator 310 and the feeder 320 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 381 or the sixth conductor 382, an input current flows through the feeder 320 and the resonator 310, generating a magnetic field that induces a current in the resonator 310. A direction of the input current flowing through the feeder 320 is the same as a direction of the induced current flowing through the resonator 310, thereby causing a strength of a total magnetic field to increase in the center of the resonator 310, and decrease near the outer periphery of the resonator 310.

An input impedance is determined by an area of a region between the resonator 310 and the feeder 320. Accordingly, a separate matching network used to match the input impedance to an output impedance of a power amplifier may not be necessary. However, if a matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have a structure that is the same as the structure of the resonator 310. For example, if the resonator 310 has a loop structure, the feeder 320 may also have a loop structure. As another example, if the resonator 310 has a circular structure, the feeder 320 may also have a circular structure.

Figure 4A:
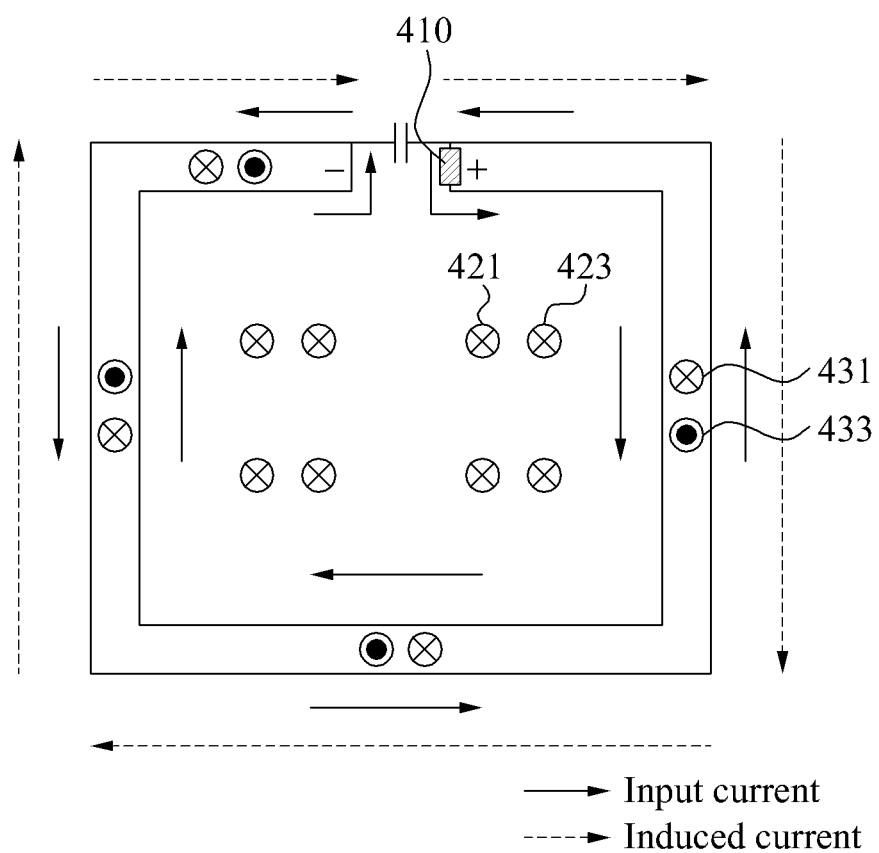
FIG. 4A illustrates an example of a distribution of a magnetic field inside a resonator of a wireless power transmitter produced by feeding a feeder.

FIG. 4A illustrates an example of a distribution of a magnetic field inside a resonator of a wireless power transmitter produced by feeding a feeder. FIG. 4A more simply illustrates the resonator 310 and the feeder 320 of FIGS. 3A and 3B, and the names of the various elements in FIG. 3B will be used in the following description of FIG. 4A without reference numerals for ease of description.

A feeding operation may be an operation of supplying power to a source resonator in wireless power transmission, or an operation of supplying AC power to a rectifier in wireless power transmission. FIG. 4A illustrates a direction of input current flowing in the feeder, and a direction of an induced current flowing in the source resonator. Additionally, FIG. 4A illustrates a direction of a magnetic field generated by the input current of the feeder, and a direction of a magnetic field generated by the induced current of the source resonator.

Referring to FIG. 4A, the fifth conductor or the sixth conductor of the feeder 320 may be used as an input port 410. In FIG. 4A, the sixth conductor of the feeder is being used as the input port 410. An RF signal is input to the input port 410. The RF signal may be output from a power amplifier. The power amplifier may increase and decrease an amplitude of the RF signal based on a power requirement of a target device. The RF signal input to the input port 410 is represented in FIG. 4A as an input current flowing in the feeder. The input current flows in a clockwise direction in the feeder along the second transmission line of the feeder. The fifth conductor and the sixth conductor of the feeder are electrically connected to the resonator. More specifically, the fifth conductor of the feeder is connected to the first signal conducting portion of the resonator, and the sixth conductor of the feeder is connected to the second signal conducting portion of the resonator. Accordingly, the input current flows in both the resonator and the feeder. The input current flows in a counterclockwise direction in the resonator along the first transmission line of the resonator. The input current flowing in the resonator generates a magnetic field, and the magnetic field induces a current in the resonator. The induced current flows in a clockwise direction in the resonator along the first transmission line of the resonator. The induced current in the resonator transfers energy to the capacitor of the resonator, and also generates a magnetic field. In FIG. 4A, the input current flowing in the feeder and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 4A, inside the feeder, a direction 421 of the magnetic field generated by the input current flowing in the feeder is the same as a direction 423 of the magnetic field generated by the induced current flowing in the resonator. Accordingly, a strength of the total magnetic field increases inside the feeder.

In contrast, as illustrated in FIG. 4A, in a region between the feeder and the resonator, a direction 433 of the magnetic field generated by the input current flowing in the feeder is opposite to a direction 431 of the magnetic field generated by the induced current flowing in the source resonator. Accordingly, the strength of the total magnetic field decreases in the region between the feeder and the resonator.

Typically, in a resonator having a loop structure, a strength of a magnetic field decreases in the center of the resonator, and increases near an outer periphery of the resonator. However, referring to FIG. 4A, since the feeder is electrically connected to both ends of the capacitor of the resonator, the direction of the induced current in the resonator is the same as the direction of the input current in the feeder. Since the direction of the induced current in the resonator is the same as the direction of the input current in the feeder, the strength of the total magnetic field increases inside the feeder, and decreases outside the feeder. As a result, due to the feeder, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A wireless power transmission efficiency of transmitting wireless power from a source resonator to a target resonator is proportional to the strength of the total magnetic field generated in the source resonator. Accordingly, when the strength of the total magnetic field increases inside the source resonator, the wireless power transmission efficiency also increases.

Figure 4B:
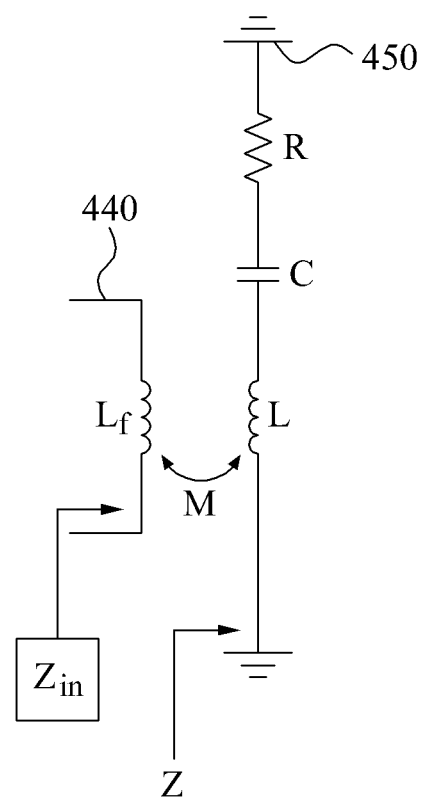
FIG. 4B illustrates an example of equivalent circuits of a feeder and a resonator of a wireless power transmitter.

FIG. 4B illustrates an example of equivalent circuits of a feeder and a resonator of a wireless power transmitter. Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 440 by a mutual inductance M, a capacitor having a capacitance C, and a resistor having a resistance R. An example of an input impedance $Z_{in}$ viewed in a direction from the feeder 440 to the resonator 450 may be expressed by the following Equation 4:

$$Z_{in} = \frac{(\omega M)^2}{Z} \quad (4)$$

In Equation 4, M denotes a mutual inductance between the feeder 440 and the resonator 450, ω denotes a resonant frequency of the feeder 440 and the resonator 450, and Z denotes an impedance viewed in a direction from the resonator 450 to a target device. As can be seen from Equation 4, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with an output impedance of a power amplifier.

In a target resonator and a feeder included in a wireless power receiver, a magnetic field may be distributed as illustrated in FIG. 4A. For example, the target resonator may receive wireless power from a source resonator via magnetic coupling. The received wireless power induces a current in the target resonator. The induced current in the target resonator generates a magnetic field, which induces a current in the feeder. If the target resonator is connected to the feeder as illustrated in FIG. 4A, a direction of the induced current flowing in the target resonator will be the same as a direction of the induced current flowing in the feeder. Accordingly, for the reasons discussed above in connection with FIG. 4A, a strength of the total magnetic field will increase inside the feeder, and will decrease in a region between the feeder and the target resonator.

Figure 5:
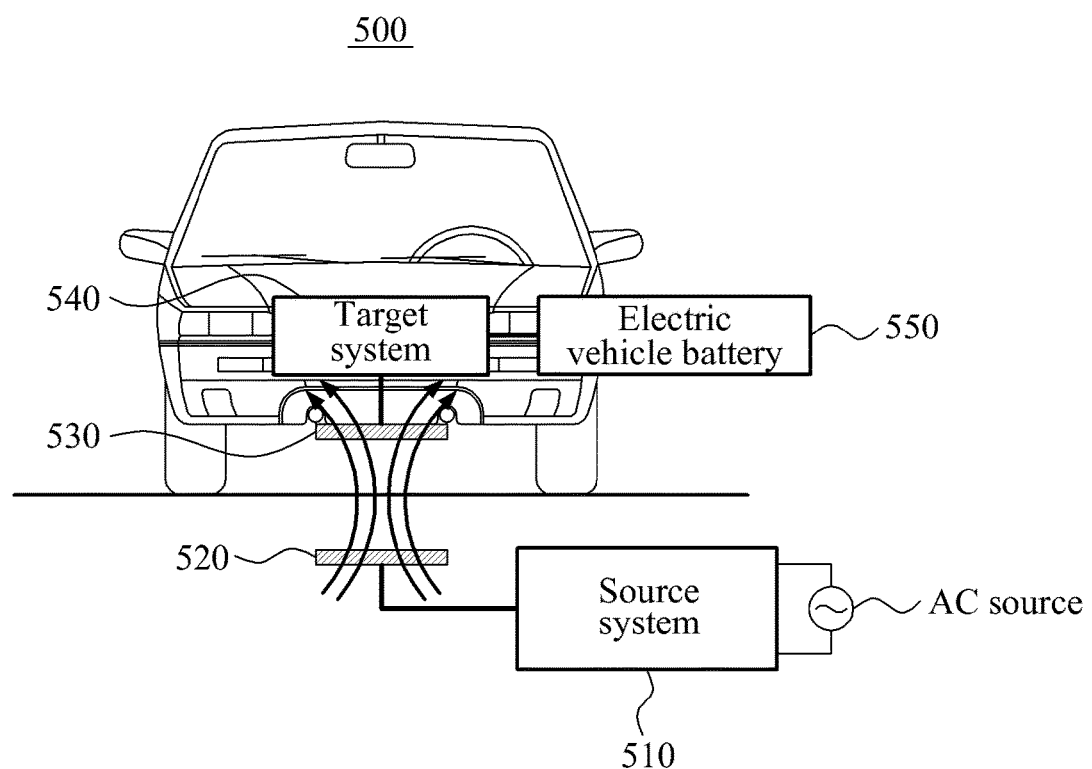
FIG. 5 illustrates an example of an electric vehicle charging system.

FIG. 5 illustrates an example of an electric vehicle charging system. Referring to FIG. 5, an electric vehicle charging system 500 includes a source system 510, a source resonator 520, a target resonator 530, a target system 540, and an electric vehicle battery 550.

In one example, the electric vehicle charging system 500 has a structure similar to the structure of the wireless power transmission system of FIG. 1. The source system 510 and the source resonator 520 in the electric vehicle charging system 500 operate as a source. The target resonator 530 and the target system 540 in the electric vehicle charging system 500 operate as a target.

In one example, the source system 510 includes a variable SMPS, a power amplifier (PA), a matching network, a TX controller, a communication unit, and a power detector similar to those of the source device 110 of FIG. 1. In one example, the target system 540 includes a matching network, a rectifier, a DC/DC converter, a communication unit, an RX controller, a voltage detector, and a power detector similar to those of the target device 120 of FIG. 1. The electric vehicle battery 550 is charged by the target system 540. The electric vehicle charging system 500 may use a resonant frequency in a band of a few kilohertz (kHz) to tens of MHz.

The source system 510 generates power based on a type of the electric vehicle being charged, a capacity of the electric vehicle battery 550, and a charging state of the electric vehicle battery 550, and wirelessly transmits the generated power to the target system 540 via a magnetic coupling between the source resonator 520 and the target resonator 530.

The source system 510 may control an alignment of the source resonator 520 and the target resonator 530. For example, when the source resonator 520 and the target resonator 530 are not aligned with each other, the TX controller of the source system 510 may transmit a message to the target system 540 to control the alignment of the source resonator 520 and the target resonator 530.

For example, when the target resonator 530 is not located in a position enabling maximum magnetic coupling, the source resonator 520 and the target resonator 530 are not properly aligned with each other. When an electric vehicle does not stop at a proper position to accurately align the source resonator 520 and the target resonator 530 with each other, the source system 510 may instruct a position of the electric vehicle to be adjusted to control the source resonator 520 and the target resonator 530 to be aligned with each other. However, this is merely an example, and other methods of aligning the source resonator 520 and the target resonator 530 with each other may be used.

The source system 510 and the target system 540 may transmit or receive an ID of an electric vehicle and exchange various messages by communicating with each other.

The descriptions of FIGS. 1 through 4B are also applicable to the electric vehicle charging system 500. However, the electric vehicle charging system 500 may use a resonant frequency in a band of a few kHz to tens of MHz, and may wirelessly transmit power that is equal to or higher than tens of watts to charge the electric vehicle battery 550.

FIGS. 6A, 6B, 7A, and 7B illustrate examples of applications using a wireless power receiver and a wireless power transmitter.

Figure 6A:
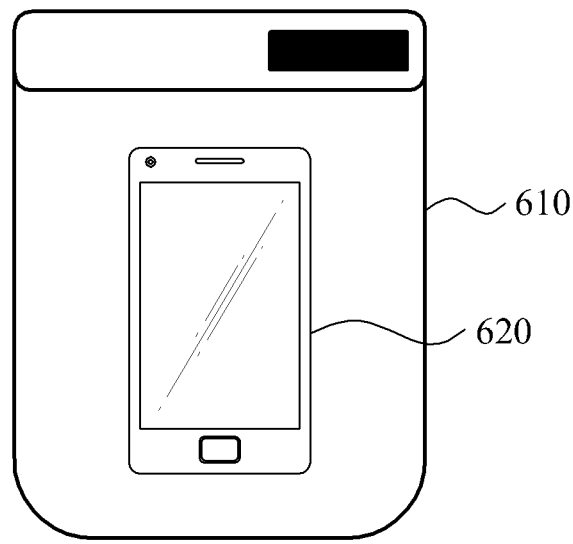
FIGS. 6A, 6B, 7A, and 7B illustrate examples of applications using a wireless power receiver and a wireless power transmitter.
Figure 6B:
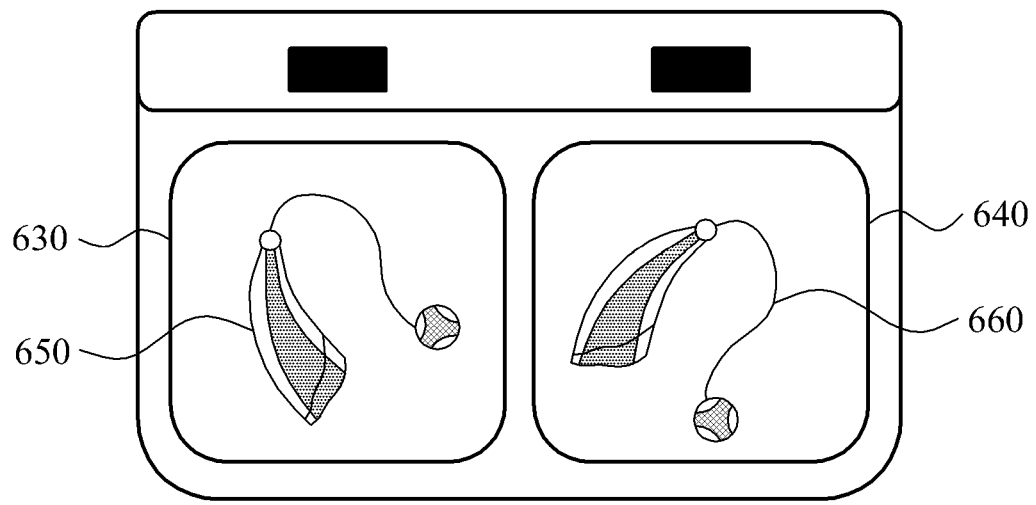

FIG. 6A illustrates an example of wireless power charging between a pad 610 and a mobile terminal 620, and FIG. 6B illustrates an example of wireless power charging between pads 630 and 640 and hearing aids 650 and 660.

In the example in FIG. 6A, a wireless power transmitter is mounted in the pad 610, and a wireless power receiver is mounted in the mobile terminal 620. The pad 610 is used to charge a single mobile terminal, namely, the mobile terminal 620.

In the example in FIG. 6B, two wireless power transmitters are respectively mounted in the first pad 630 and the second pad 640. The hearing aids 650 and 660 may be used for a left ear and a right ear, respectively. In this example, two wireless power receivers are respectively mounted in the hearing aids 650 and 660.

Figure 7A:
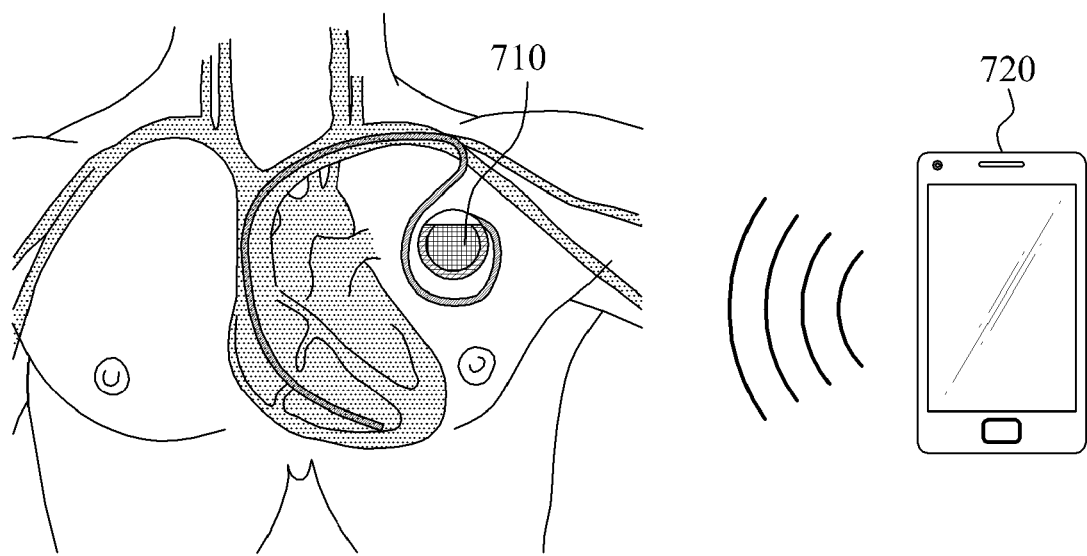
Figure 7B:
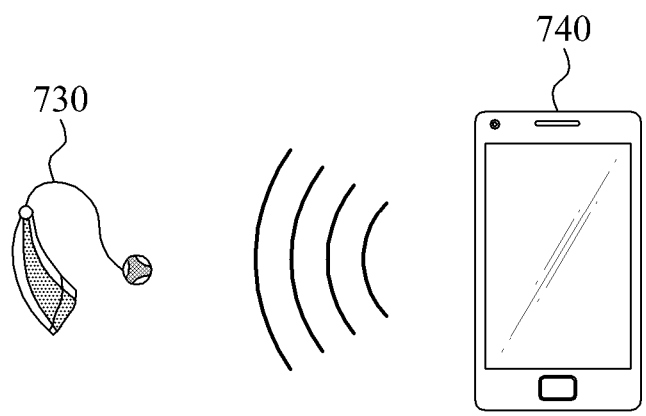

FIG. 7A illustrates an example of wireless power charging between an electronic device 710 that is inserted into a human body and a mobile terminal 720. FIG. 7B illustrates an example of wireless power charging between a hearing aid 730 and a mobile terminal 740.

In the example in FIG. 7A, a wireless power transmitter and a wireless power receiver are mounted in the mobile terminal 720, and a wireless power receiver is mounted in the electronic device 710 inserted in the body. The electronic device 710 inserted in the body is charged by receiving power from the mobile terminal 720.

In the example in FIG. 7B, a wireless power transmitter and a wireless power receiver are mounted in the mobile terminal 740, and a wireless power receiver is mounted in the hearing aid 730. The hearing aid 730 is charged by receiving power from the mobile terminal 740. Low-power electronic devices, such as, for example, Bluetooth earphones, may also be charged by receiving power from the mobile terminal 740.

Figure 8:
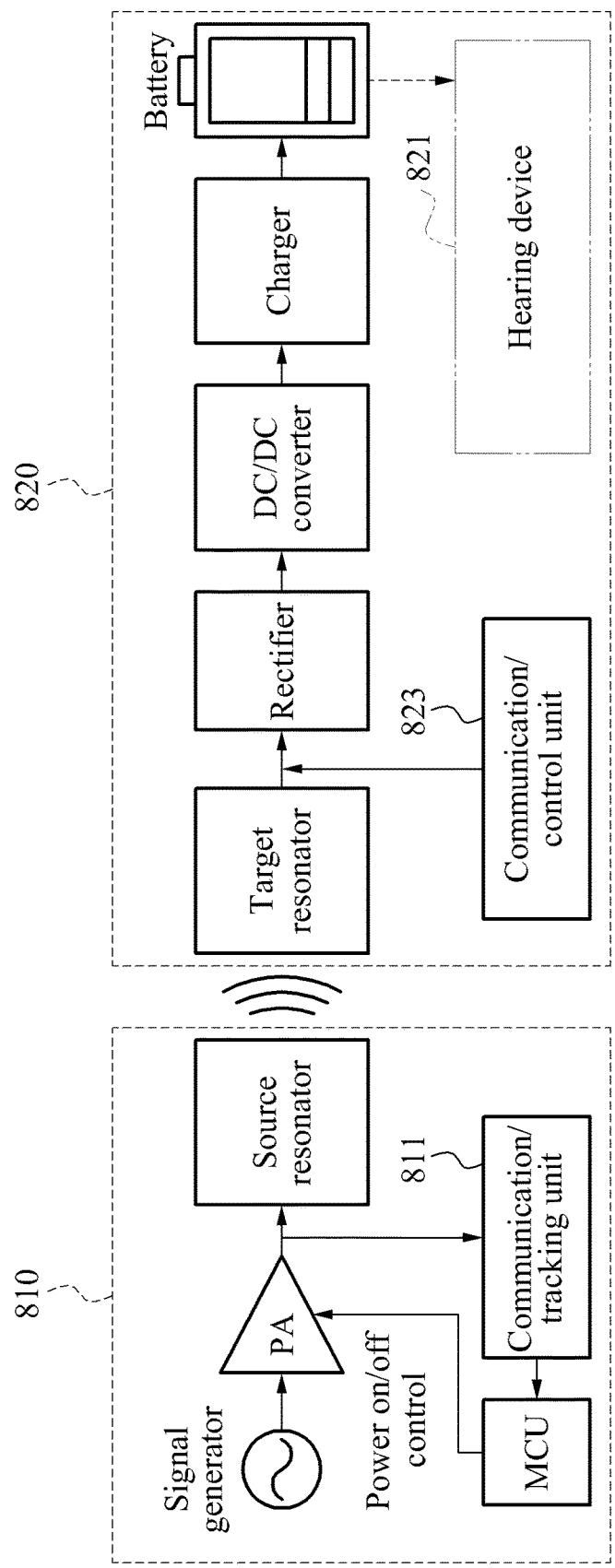
FIG. 8 illustrates an example of a wireless power transmitter and a wireless power receiver.

FIG. 8 illustrates an example of a wireless power transmitter and a wireless power receiver. A wireless power transmitter 810 of FIG. 8 may be mounted in the pad 610 of FIG. 6A, the pads 630 and 640 of FIG. 6B, the mobile terminal 720 of FIG. 7A, and the mobile terminal 740 of FIG. 7B. A wireless power receiver 820 may be mounted in the mobile terminal 620 of FIG. 6A, the hearing aids 650 and 660 of FIG. 6B, the electronic device 710 and the mobile terminal 720 of FIG. 7A, and the hearing aid 730 and the mobile terminal 740 of FIG. 7B.

The wireless power transmitter 810 has a configuration similar to a configuration of the source device 110 of FIG. 1. For example, the wireless power transmitter 810 may include a unit configured to transmit power via magnetic coupling. As illustrated in FIG. 8, the wireless power transmitter 810 includes a signal generator, a power amplifier (PA), a communication/tracking unit 811, a micro control unit (MCU), and a source resonator. The signal generator generates a signal having a resonant frequency of the source resonator. The communication/tracking unit 811 communicates with the wireless power receiver 820, and controls an input impedance and a resonant frequency to maintain a wireless power transmission efficiency. The communication/tracking unit 811 and the MCU perform functions similar to functions performed by the TX controller 114 and the communication unit 115 of FIG. 1.

The wireless power receiver 820 has a configuration similar to a configuration of the target device 120 of FIG. 1. For example, the wireless power receiver 820 may include a unit configured to wirelessly receive power and to charge a battery with the received power. As illustrated in FIG. 8, the wireless power receiver 820 includes a target resonator, a rectifier, a DC/DC converter, a charger, a battery, and a communication/control unit 823. The communication/control unit 823 communicates with the wireless power transmitter 810, and performs an operation to protect a device powered by the wireless power receiver 820 from overvoltage and overcurrent.

The wireless power receiver 820 may include a hearing device 821. The hearing device 821 may be powered by the battery. The hearing device 821 may include a microphone, an analog-to-digital converter (ADC), a processor, a digital-to-analog converter (DAC), and a receiver. For example, the hearing device 821 may have the same configuration as a hearing aid.

Figure 9:
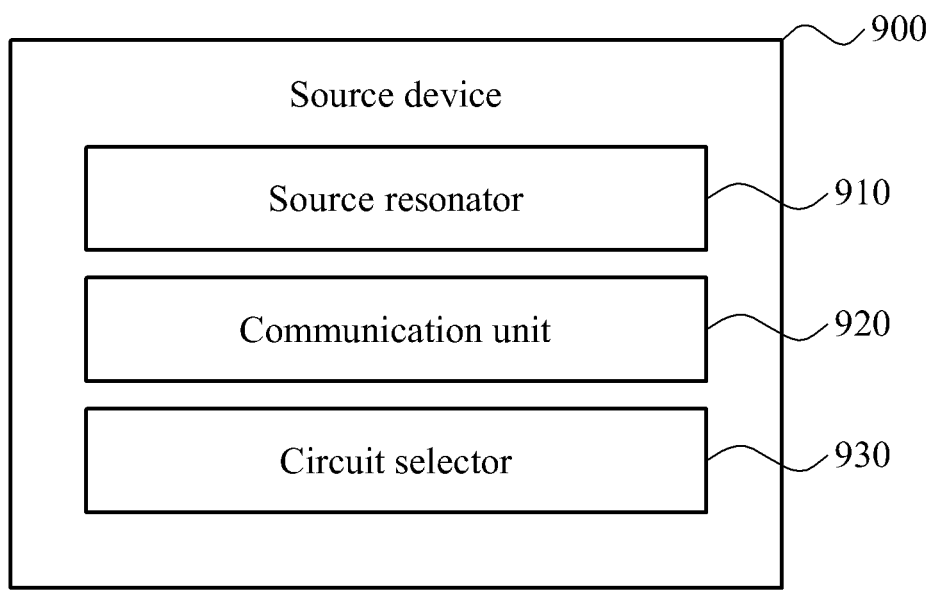
FIG. 9 illustrates an example of a structure of a source device.

FIG. 9 illustrates an example of a structure of a source device. The source device 900 may change a magnitude of a magnetic field generated by the source device 900 and an input impedance of the source device 900. The source device 900 may adaptively generate an optimum magnetic field for a target device based on a distance between the source device 900 and the target device and a magnitude of a magnetic field to be received by the target device. The source device 900 may transmit power to various target devices by adaptively changing the input impedance of the source device 900 based on an input impedance of a target resonator included in the target device. Referring to FIG. 9, the source device 900 includes a source resonator 910, a communication unit 920, and a circuit selector 930.

The source resonator 910 includes a plurality of loop circuits configured to generate different magnetic fields depending on a length of each of the plurality of loop circuits.

The plurality of loop circuits include a plurality of capacitors corresponding to each of the plurality of loop circuits, a plurality of first switches to connect each of the plurality of capacitors to the plurality of loop circuits, and a plurality of second switches to supply a power to each of the plurality of loop circuits.

The source device 900 determines whether to turn ON the first switch or the second switch for each of the plurality of loop circuits.

For example, when the source device 900 turns ON the second switch of a first loop circuit, the second switch supplies a power to the first loop circuit, thereby determining the input impedance of the source resonator 910 since the input impedance of the source resonator 910 depends on which one of the plurality of loop circuits is selected as the first loop circuit. Thus, the first loop circuit may be used as a feeder of the source resonator 910.

When the source device 900 turns ON the first switch of a second loop circuit, the first switch connects a corresponding capacitor to the second loop circuit, thereby causing the second loop circuit to generate a magnetic field. A resonant frequency f of the magnetic field generated by the second loop circuit may be expressed by the following Equation 5:

$$f = \frac{1}{2\pi\sqrt{\frac{L}{C}}} \qquad (5)$$

In Equation 5, L denotes an inductance of the source resonator 910 determined by the first loop circuit and the second loop circuit, and C denotes a capacitance of the capacitor connected to the second loop circuit.

A detailed description of examples of the source resonator 910 is provided below with reference to FIGS. 11 through 14.

The communication unit 920 may receive either one or both of information associated with a target device and information associated with a relay device by communicating with either one or both of the target device and the relay device.

If the target device is movable, the source device 900 may verify whether the target device is located within an area in which the source device 900 is able to transmit power. The source device 900 may transmit power based on any one or any combination of input impedance information of the target device, distance information of a distance between the source device 900 and the target device, and magnitude information of a magnetic field to be received by the target device.

Accordingly, the communication unit 920 may receive the information associated with the target device from the target device located within the area in which the source device 900 is able to transmit power. The information associated with the target device may include any one or any combination of location information of the target device, input impedance information of the target device, and magnitude information of a magnetic field to be received by the target device.

If the target device is able to change either one or both of the input impedance of the target device and the magnitude of the magnetic field to be received by the target device, the source device 900 may receive, from the target device, information including either one or both of a range of the input impedance changeable by the target device and a range of the magnitude of the magnetic field that can be received by the target device. The source device 900 may determine the input impedance and the magnitude of the magnetic field of the target device for maximum wireless power transmission efficiency based on the information received from the target device. The communication unit 920 may transmit the determined input impedance and the determined magnitude of the magnetic field of the target device to the target device.

When a relay device configured to relay power between the source device 900 and the target device is present, the source device 900 may transmit power to the target device via the relay device based on information associated with the relay device and the information associated with the target device.

Accordingly, the communication unit 920 may receive the information associated with the relay device from the relay device. The information associated with the relay device may include any one or any combination of distance information of a distance between the relay device and the source resonator 910, magnitude information of the magnetic field relayed by the relay device, information associated with the target device to which the relay device relays power, and input impedance information of the relay device.

The circuit selector 930 may select one loop circuit to generate a magnetic field among the plurality of loop circuits included in the source resonator 910 based on the information associated with the target device or the information associated with the relay device.

The circuit selector 930 may determine the input impedance of the source resonator 910 based on an input impedance of the target device.

The circuit selector 930 may select a loop circuit to be used as a feeder among the plurality of loop circuits included in the source resonator 910 based on the determined input impedance. The circuit selector 930 may use the selected loop circuit as a feeder by turning ON the second switch of the selected loop circuit to supply a power to the selected loop circuit. The input impedance of the source resonator 910 is determined by the selected loop circuit used as a feeder.

The circuit selector 930 may determine the magnitude of the magnetic field to be generated by the source resonator 910 based on the information associated with the target device.

For example, the circuit selector 930 may determine the magnitude of the magnetic field to be generated by the source resonator 910 based on the magnitude of the magnetic field to be received by the target device.

Also, the circuit selector 930 may determine the magnitude of the magnetic field to be generated by the source resonator 910 based on a distance between the target device and the source resonator 910. The circuit selector 930 may determine the distance between the target device and the source device 900 based on the location information of the target device, and may determine the magnitude of the magnetic field to be generated by the source resonator 910 based on the determined distance.

For example, if the distance between the target device and the source device 900 is relatively great, the magnitude of the magnetic field received by the target device may be smaller than the magnitude of the magnetic field generated by the source device 900 since the magnitude of a magnetic field decreases with distance. Accordingly, the circuit selector 930 may determine the magnitude of the magnetic field to be generated by the source resonator 910 to be greater than the magnitude of the magnetic field to be received by the target device.

Conversely, if the distance between the target device and the source device 900 is relatively small, the magnitude of the magnetic field received by the target device may be equal to the magnitude of the magnetic field generated by the source device 900. Therefore, the circuit selector 930 may determine the magnitude of the magnetic field to be generated by the source resonator 910 to be equal to the magnitude of the magnetic field to be received by the target device.

The circuit selector 930 may select one loop circuit to generate a magnetic field among the plurality of loop circuits included in the source resonator 910 based on the determined magnitude of the magnetic field to be generated by the source resonator 910. The circuit selector 930 may select one loop circuit to be used as a feeder among the remaining loop circuits of the source resonator 910 excluding the loop circuit selected to generate a magnetic field based on the determined input impedance of the source resonator 910.

The circuit selector 930 may turn ON the first switch of the loop circuit selected to generate a magnetic field to enable the source resonator 910 to generate a magnetic field corresponding to the loop circuit selected to generate a magnetic field. The circuit selector 930 may turn ON the second switch of the loop circuit selected to be used as a feeder to enable the loop circuit selected to be used as a feeder to operate as a feeder of the source resonator 910.

The circuit selector 930 may determine a magnetic field transmission efficiency for each of the target device and the relay device based on information received by the communication unit 920 from each of the target device and the relay device, and may select either the target device or the relay device based on the determined magnetic field transmission efficiencies.

Before transmitting power to the target device, the circuit selector 930 may transmit a test power to test the magnetic field transmission efficiency. The circuit selector 930 may control the first switches of the source resonator 910 to vary a magnitude of a magnetic field generated by the source resonator 910 corresponding to the test power.

The communication unit 920 may receive, from the target device, magnitude information of the magnetic field received by the target device or scattering information associated with a scattering parameter. The communication unit 920 may receive information from the target device via in-band communication or out-of-band communication. The scattering information may include a gain function $S_{21}$ that is designated within an operating frequency range and used for a forward transmission.

The circuit selector 930 may determine the magnetic field transmission efficiency based on the information received from the target device. For example, the circuit selector 930 may determine the magnetic field transmission efficiency based on a ratio of the magnitude of the magnetic field received by the target device to the magnitude of the magnetic field generated by the source resonator 910. The circuit selector 930 may determine a scattering parameter based on the scattering information and may determine the magnetic field transmission efficiency based on the scattering information. Here, the circuit selector 930 may select the target device or the relay device using an external matching network, for example, a source-target matching network. The source-target matching network may match the source device 900 and the target device, and may have a high magnetic field transmission efficiency.

Figure 10:
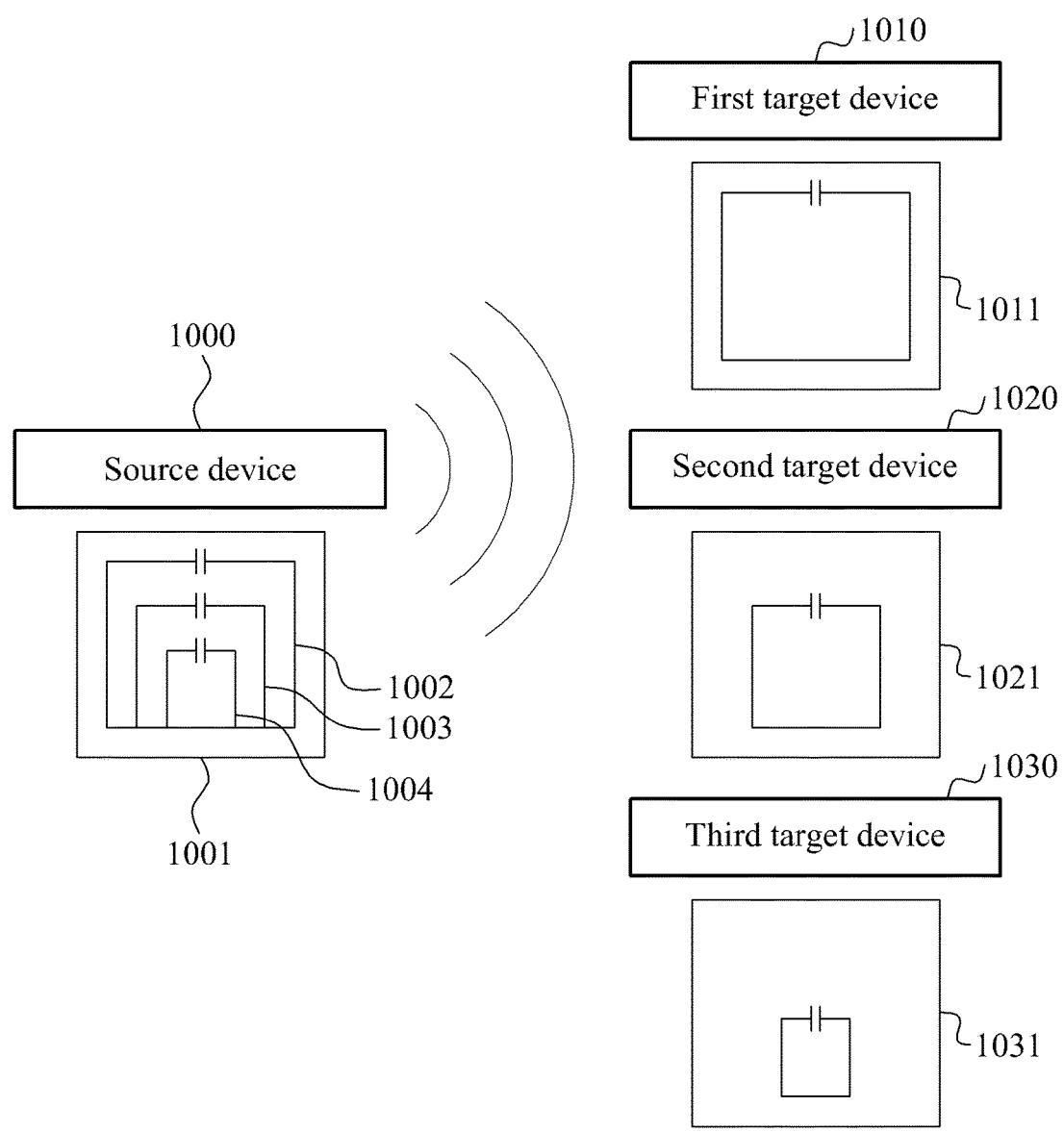
FIG. 10 illustrates an example of a wireless power transmission system.

FIG. 10 illustrates an example of a wireless power transmission system. In FIG. 10, power is transmitted from the source device of FIG. 9 to a plurality of target devices. Referring to FIG. 10, the wireless power transmission system includes a source device 1000, a first target device 1010, a second target device 1020, and a third target device 1030. The source device 1000, the first target device 1010, the second target device 1020, and the third target device 1030 may transmit and receive power using a source resonator 1001, a target resonator 1011, a target resonator 1021, and a target resonator 1031, respectively. Loop circuits respectively included in the target resonator 1011, the target resonator 1021, and the target resonator 1031 have different lengths.

The source device 1000 generates a magnetic field to wirelessly transmit power. The source device 1000 may change a length of a loop circuit used to generate the magnetic field depending on the target device to which the source device 1000 intends to transmit power. The source resonator 1001 of the source device 1000 includes a plurality of loop circuits 1002, 1003, and 1004 having different lengths and each connected to a respective capacitor.

The source device 1000 may select a loop circuit to generate a magnetic field among the plurality of loop circuits included in the source device 1000 based on a distance between the source device 1000 and the target device. That is, the source device 1000 may transmit a magnetic field having an optimum magnitude to each of the target devices placed at different locations by controlling a magnitude of a magnetic field to be generated by the source device 1000 based on a location of the target device to which the source device 1000 intends to transmit power.

For example, when the source device 1000 intends to transmit power to a target device located at a farthest place within a range over which the source device 1000 is able to transmit power, the source device 1000 selects a loop circuit 1002 that generates a magnetic field having a greatest magnitude among the plurality of loop circuits included in the source resonator 1001. When the source resonator 1001 generates a magnetic field using the loop circuit 1002 selected by the source device 1000, the target device located at the farthest place within the wireless power transmission range receives a magnetic field having a decreased magnitude due to the relatively great distance between the source device 1000 and the target device.

Also, the source device 1000 may select a loop circuit to generate a magnetic field among the plurality of loop circuits included in the source resonator 1001 based on the length of the loop circuit included in the target resonator of the target device. That is, the source device 1000 may transmit the magnetic field to the target devices capable of receiving magnetic fields having different magnitudes by controlling the magnitude of the magnetic field to be generated based on the target device to which the source device 1000 intends to transmit power.

For example, when the source device 1000 transmits power to the first target device 1010, the source device 1000 selects the loop circuit 1002 corresponding to the length of the loop circuit of the target resonator 1011 among the plurality of loop circuits included in the source resonator 1001. When the source resonator 1001 generates a magnetic field using the loop circuit 1002, the first target device 1010 receives the magnetic field through the target resonator 1011.

When the source device 1000 transmits power to the second target device 1020, the source device 1000 selects a loop circuit 1003 corresponding to the length of the loop circuit of the target resonator 1021 among the plurality of loop circuits included in the source resonator 1001. When the source resonator 1001 generates a magnetic field using the loop circuit 1003, the second target device 1020 receives the magnetic field through the target resonator 1021.

When the source device 1000 transmits power to the third target device 1030, the source device 1000 selects a loop circuit 1004 corresponding to the length of the loop circuit of the target resonator 1031 among the plurality of loop circuits included in the source resonator 1001. When the source resonator 1001 generates a magnetic field using the loop circuit 1004, the third target device 1030 receives the magnetic field through the target resonator 1031.

The first target device 1010, the second target device 1020, and the third target device 1030 may receive the magnetic field from the source device 1000, and may generate power corresponding to the received magnetic field. The target resonator 1011 of the first target device 1010, the target resonator 1021 of the second target device 1020, and the target resonator 1031 of the third target device 1030 may generate the power corresponding to the received magnetic field using the same input impedance as the source resonator 1001.

Figure 11:
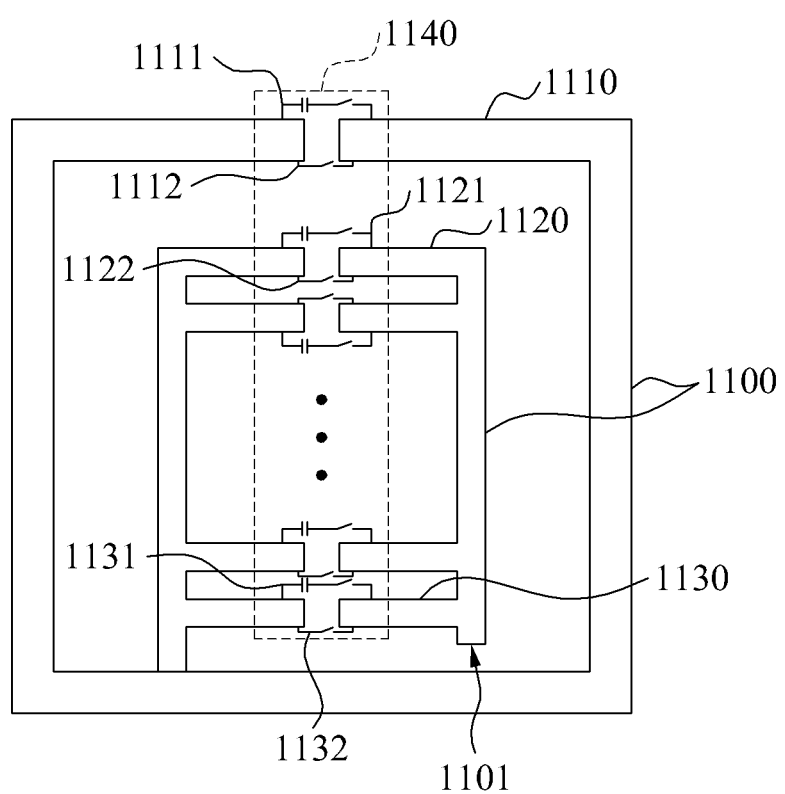
FIG. 11 illustrates an example of a source resonator.

FIG. 11 illustrates an example of a source resonator. Referring to FIG. 11, the source resonator includes a plurality of loop circuits 1100 having different lengths. For the purposes of this discussion, the plurality of loop circuits 1100 may be considered to include a first loop circuit 1110, a second loop circuit 1120, and a third loop circuit 1130, although more than three loop circuits are actually shown in FIG. 11. The second loop circuit 1120 and the third loop circuit 1130 may be inner bars of the source resonator. The plurality of loop circuits 1100 include a plurality of first switches 1111, 1121, and 1131 to connect the plurality of loop circuits 1100 to a plurality of capacitors corresponding to each of the plurality of loop circuits 1100, and a plurality of second switches 1112, 1122, and 1132 to supply a power to each of the plurality of loop circuits 1100.

The capacitors corresponding to each of the plurality of loop circuits 1100 may have different capacitances depending on a length of each of the plurality of loop circuits 1100. For example, when power flows through the first switch of a loop circuit to generate a magnetic field, an inductance value may be determined based on the length of the corresponding loop circuit. That is, even though the second switch of the same loop circuit may be turned ON, the inductance value of the source resonator may be changed based on the length of the loop circuit of which the first switch is turned ON. Accordingly, the capacitance of the capacitor connected to the first switch may be determined based on the length of the loop circuit to which the first switch is connected to prevent a resonant frequency from changing based on the length of the loop circuit connected to the first switch. That is, the capacitances of the capacitors connected to the plurality of loop circuits 1100 are determined so that the plurality of loop circuits have a same resonant frequency.

For example, the length of the second loop circuit 1120 is longer than the length of the third loop circuit 1130. Therefore, when power flows through the second loop circuit 1120, the inductance value will increase compared to when power flows through the third loop circuit 1130. Accordingly, the capacitor connected to the first switch 1121 of the second loop circuit 1120 has a smaller capacitance than the capacitor connected to the first switch 1131 of the third loop circuit 1130 so that a resonant frequency of the magnetic field generated when the first switch 1121 of the second loop circuit 1120 is turned ON will be the same as a resonant frequency of the magnetic field generated when the first switch 1131 of the third loop circuit 1130 is turned ON.

The generation of the magnetic field by the source resonator is described below.

For example, a circuit selector 1140 of the source device may select the third loop circuit 1130 as a feeder based on an input impedance of the source resonator, and may select the first loop circuit 1110 to generate a magnetic field based on information associated with a target device. The circuit selector 1140 of the source device may turn the second switch 1132 of the third loop circuit 1130 ON, and may turn all of the second switches of the remaining loop circuits OFF, including the second switch 1112 of the first loop circuit 1110 and the second switch 1122 of the second loop circuit 1120. Also, the circuit selector 1140 of the source device may turn the first switch 1111 of the first loop circuit 1130 ON, and may turn all of the first switches of the remaining loop circuits OFF, including the first switch 1121 of the second loop circuit 1120 and the first switch 1131 of the third loop circuit 1130.

A power supplied via an input port 1101 flows through the third loop circuit 1130 selected as a feeder by the second switch 1132 of the third loop circuit 1130. The third loop circuit 1130 selected as a feeder determines the input impedance of the source resonator. The greater the area enclosed by the loop circuit selected as a feeder, the greater the input impedance of the source resonator will be. The power flowing through the third loop circuit 1130 also flows through the capacitor connected to the first switch 1111 of the first loop circuit 1110. The first loop circuit 1110 resonates with the magnetic field generated by the feeder through which the power flows to generate a magnetic field having a magnitude corresponding to the length of the first loop circuit 1110. The longer the length of a loop circuit, the greater the magnitude of the magnetic field generated by the loop circuit.

Figure 12:
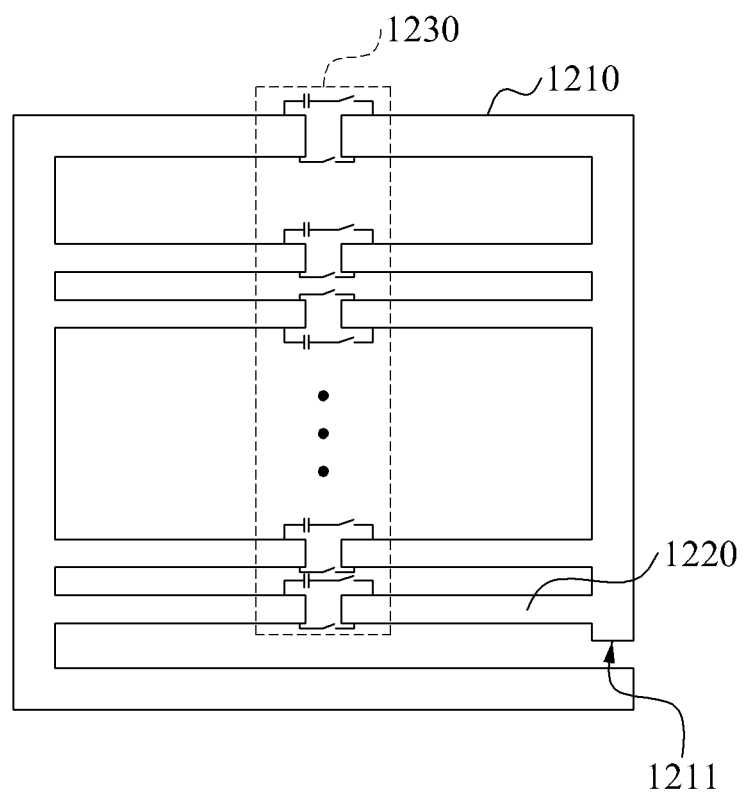
FIG. 12 illustrates another example of a source resonator.

FIG. 12 illustrates another example of a source resonator. The loop circuits of the source resonator in FIG. 12 are different from the loop circuits of the source resonator in FIG. 11. Referring to FIG. 12, the source resonator includes an input port 1211 through which power is supplied on a longest loop circuit 1210 among a plurality of loop circuits including loop circuits 1210 and 1220. The power supplied through the input port 1211 may be input to a loop circuit including a second switch that is turned ON by a circuit selector 1230. The loop circuit including the second switch that is turned ON operates as a feeder. The power supplied through the input port 1211 passes through a capacitor connected to a first switch that is turned ON by the circuit selector 1230 and a loop circuit including the corresponding capacitor to generate a magnetic field.

Figure 13:
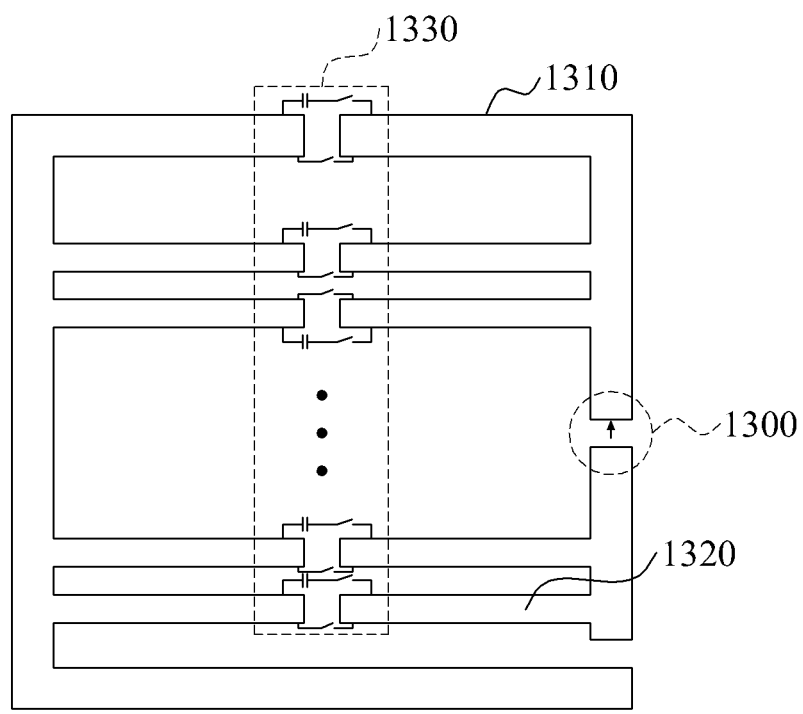
FIG. 13 illustrates another example of a source resonator.

FIG. 13 illustrates another example of a source resonator. The loop circuits of the source resonator in FIG. 13 are different from the loop circuits of the source resonators in FIGS. 11 and 12. Referring to FIG. 13, the source resonator includes an input port 1300 through which power is supplied on a longest loop circuit 1310 among a plurality of loop circuits including loop circuits 1310 and 1320. The power is supplied through the input port 1300 in the direction indicated by the arrow. A circuit selector turns ON at least one of a plurality of second switches of the loop circuits above the input port 1300.

Figure 14:
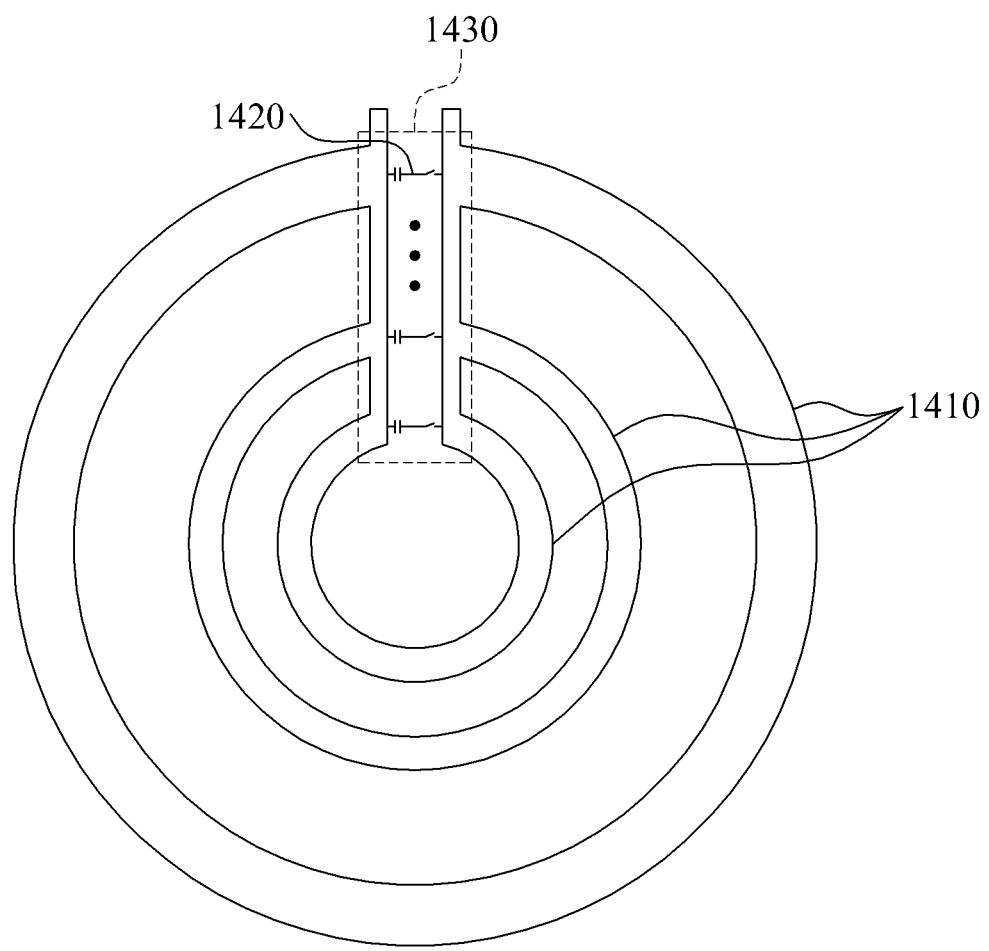
FIG. 14 illustrates another example of a source resonator.

FIG. 14 illustrates another example of a source resonator. The loop circuits of the source resonator in FIG. 14 are circular loop circuits, and are different from the loop circuits of the source resonators in FIGS. 11, 12, and 13. The source resonator includes a plurality of first switches 1420 to connect a plurality of loop circuits 1410 to a plurality of capacitors corresponding to each of the plurality of loop circuits 1410. Each of the first switches 1420 is supplied with power. When the circuit selector 1430 turns one of the first switches 1420 ON, the power flows through a capacitor connected to the first switch that is turned ON and a loop circuit including the corresponding capacitor, causing the source generator to generate a magnetic field.

Figure 15:
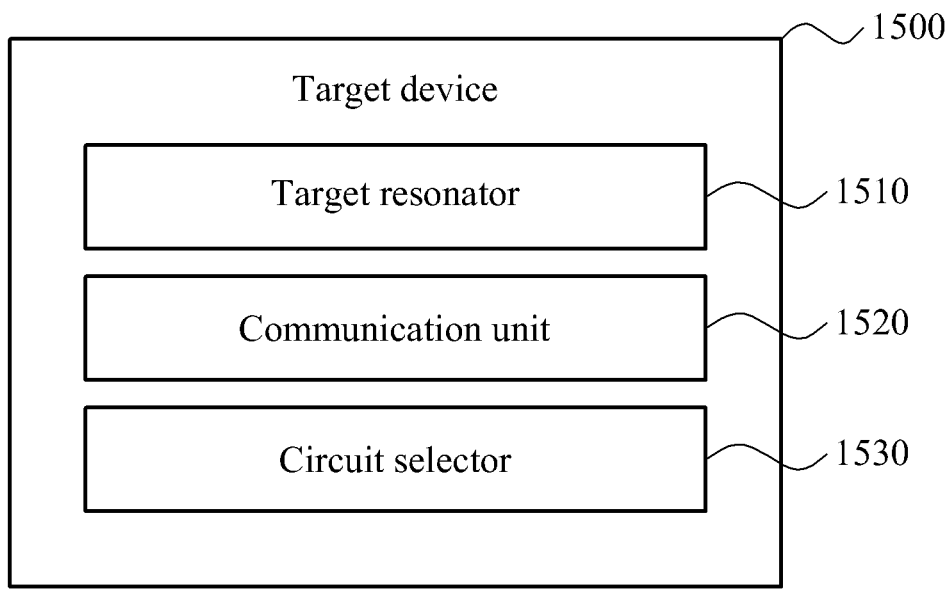
FIG. 15 illustrates an example of a structure of a target device.

FIG. 15 illustrates an example of a structure of a target device. The target device 1500 may change a magnitude of a magnetic field to be received by a target resonator of the target device 1500 and an input impedance of the target resonator. The target device 1500 may enhance a magnetic field reception efficiency of the target device 1500 by adaptively changing the magnitude of the magnetic field to be received by the target resonator based on a distance between a source device and the target device 1500 and a magnitude of the magnetic field to be generated by the source device. Also, the target device 1500 may receive power from various source devices by adaptively changing an input impedance of the target device 1500 based on an input impedance of a source resonator included in the source device. Referring to FIG. 15, the target device 1500 includes a target resonator 1510, a communication unit 1520, and a circuit selector 1530.

The target resonator 1510 includes a plurality of loop circuits configured to receive different magnetic fields depending on a length of each of the plurality of loop circuits.

The plurality of loop circuits include a plurality of capacitors corresponding to each of the plurality of loop circuits, a plurality of first switches to connect each of the plurality of capacitors to the plurality of loop circuits, and a plurality of second switches to supply a power to each of the plurality of loop circuits.

The target device 1500 determines whether to turn ON the first switch or the second switch for each of the plurality of loop circuits.

For example, when the target device 1500 turns ON the second switch of a first loop circuit, a power generated by the target resonator 1510 corresponding to the magnetic field received from the source device flows through the first loop circuit, thereby determining the input impedance of the target resonator 1510 since the input impedance of the target resonator 1510 depends on which one of the plurality of loop circuits is selected as the first loop circuit. Thus, the first loop circuit may be used as a feeder of the target resonator 1510 to output the power generated by the target resonator 1510.

When the target device 1500 turns ON the first switch of a second loop circuit, the first switch connects a corresponding capacitor to the second loop circuit, thereby causing the second loop circuit to generate a power corresponding to the magnetic field received from the source device based on an inductance of the target resonator 1510 determined by the first loop circuit and the second loop circuit and a capacitance of the capacitor connected to the second loop circuit.

The target resonator 1510 may have a same configuration as any of the source resonators of FIGS. 11 through 14.

The communication unit 1520 may receive either one or both of information associated with a source device and information associated with a relay device by communicating with either one or both of the source device and the relay device.

If the target device 1500 is movable, the target device 1500 may verify a source device from which the target device 1500 is able to receive power at a location of the target device 1500. The target device 1500 may receive the power based on either one or both of an input impedance of the source device and a magnitude of a magnetic field generated by the source device.

Accordingly, the communication unit 1520 may receive information associated with the source device from at least one source device that is able to transmit power to the target device 1500. The information associated with the source device may include any one or any combination of location information of the source device, input impedance information of the source device, and magnitude information of the magnetic field generated by the source device.

If the source device is able to change either one or both of the input impedance of the source device and the magnitude of the magnetic field to be generated by the source device, the target device 1500 may receive, from the source device, information including either one or both of a range of the input impedance changeable by the source device and a range of the magnitude of the magnetic field that can be generated by the source device. The target device 1500 may determine the input impedance and the magnitude of the magnetic field of the source device for maximum wireless power transmission efficiency based on the information received from the source device. The communication unit 1520 may transmit the determined input impedance and the determined magnitude of the magnetic field of the source device to the source device.

When a relay device configured to relay power between the source device and the target device 1500 is present, the target device 1500 may receive the power relayed by the relay device based on information associated with the relay device.

Accordingly, the communication unit 1520 may the information associated with the relay device from the relay device. The information associated with the relay device may include any one or any combination of distance information of a distance between the relay device and the target device, information associated with the source device from which the relay device relays power, magnitude information of the magnetic field relayed by the relay device, and input impedance information of the relay device.

The circuit selector 1530 may select one loop circuit to receive a magnetic field among the plurality of loop circuits included in the target resonator 1510 based on the information associated with the source device or the information associated with the relay device.

The circuit selector 1530 may determine the input impedance of the target resonator 1510 based on an input impedance of the source device and a capacitor included in the loop circuit selected to receive a magnetic field.

The circuit selector 1530 may select a loop circuit to be used as a feeder among the plurality of loop circuits included in the target resonator 1510 based on the determined input impedance. The circuit selector 1530 may use the selected loop circuit as a feeder by turning ON the second switch of the selected loop circuit to enable a power generated by the loop circuit selected to receive a magnetic field to flow through the selected loop circuit. The input impedance of the target resonator 1510 is determined by the selected loop circuit used as a feeder.

The circuit selector 1530 may determine the magnitude of the magnetic field to be received by the target resonator 1510 based on the information associated with the source device.

For example, the circuit selector 1530 may determine the magnitude of the magnetic field to be received by the target resonator 1510 based on the magnitude of the magnetic field generated by the source device.

Also, the circuit selector 1530 may determine the magnitude of the magnetic field to be received by the target resonator 1510 based on a distance between the target device 1500 and the source resonator. The circuit selector 1530 may determine the distance between the source device and the target device 1500 based on the location information of the source device, and may determine the magnitude of the magnetic field to be received by the target resonator 1510 based on the determined distance.

For example, if the distance between the source device and the target device 1500 is relatively great, the magnitude of the magnetic field received by the target device 1500 may be smaller than the magnitude of the magnetic field generated by the source device since the magnitude of a magnetic field decreases with distance. Accordingly, the circuit selector 1530 may determine the magnitude of the magnetic field received by the target resonator 1510 to be smaller than the magnitude of the magnetic field generated by the source device.

Conversely, if the distance between the target device 1500 and the source device is relatively small, the magnitude of the magnetic field received by the target device 1500 may be equal to the magnitude of the magnetic field generated by the source device. Therefore, the circuit selector 1530 may determine the magnitude of the magnetic field to be received by the target resonator 1510 to be equal to the magnitude of the magnetic field generated by the source device.

The circuit selector 1530 may select one loop circuit to receive a magnetic field among the plurality of loop circuits included in the target resonator 1510 based on the determined magnitude of the magnetic field to be received by the target resonator 1510. The circuit selector 1530 may select one loop circuit to be used as a feeder among the remaining loop circuits of the target resonator 1510 excluding the loop circuit selected to generate a magnetic field based on the determined input impedance of the target resonator 1510.

The circuit selector 1530 may turn ON the first switch of the loop circuit selected to receive a magnetic field to enable the target resonator 1510 to receive a magnetic field corresponding the loop circuit selected to receive a magnetic field. The circuit selector 1530 may turn ON the second switch of the loop circuit selected to be used as a feeder to enable the loop circuit selected to be used as a feeder to operate as a feeder of the target resonator 1510.

The circuit selector 1530 may determine a magnetic field transmission efficiency for each of the source device and the relay device based on information received by the communication unit 1520 from each of the source device and the relay device, and may select either the source device or the relay device based on the determined magnetic field transmission efficiencies.

Before receiving power, the target device 1500 may receive, from at least one source device, a test power to test the magnetic field transmission efficiency. The communication unit 1520 may receive, from the source device, magnitude information of the magnetic field generated by the source device.

The circuit selector 1530 may control the first switches of the target resonator 1510 based on the received information to vary a magnitude of a magnetic field to be received by the target resonator 1510.

The circuit selector 1530 may determine the magnetic field transmission efficiency based on the information received from the source device and the magnetic field received by the target resonator 1510. For example, the circuit selector 1530 may determine the magnetic field transmission efficiency based on a ratio of the magnitude of the magnetic field generated by the source device included in the information received from the source device to the magnitude of the magnetic field received by the target resonator 1510.

Figure 16:
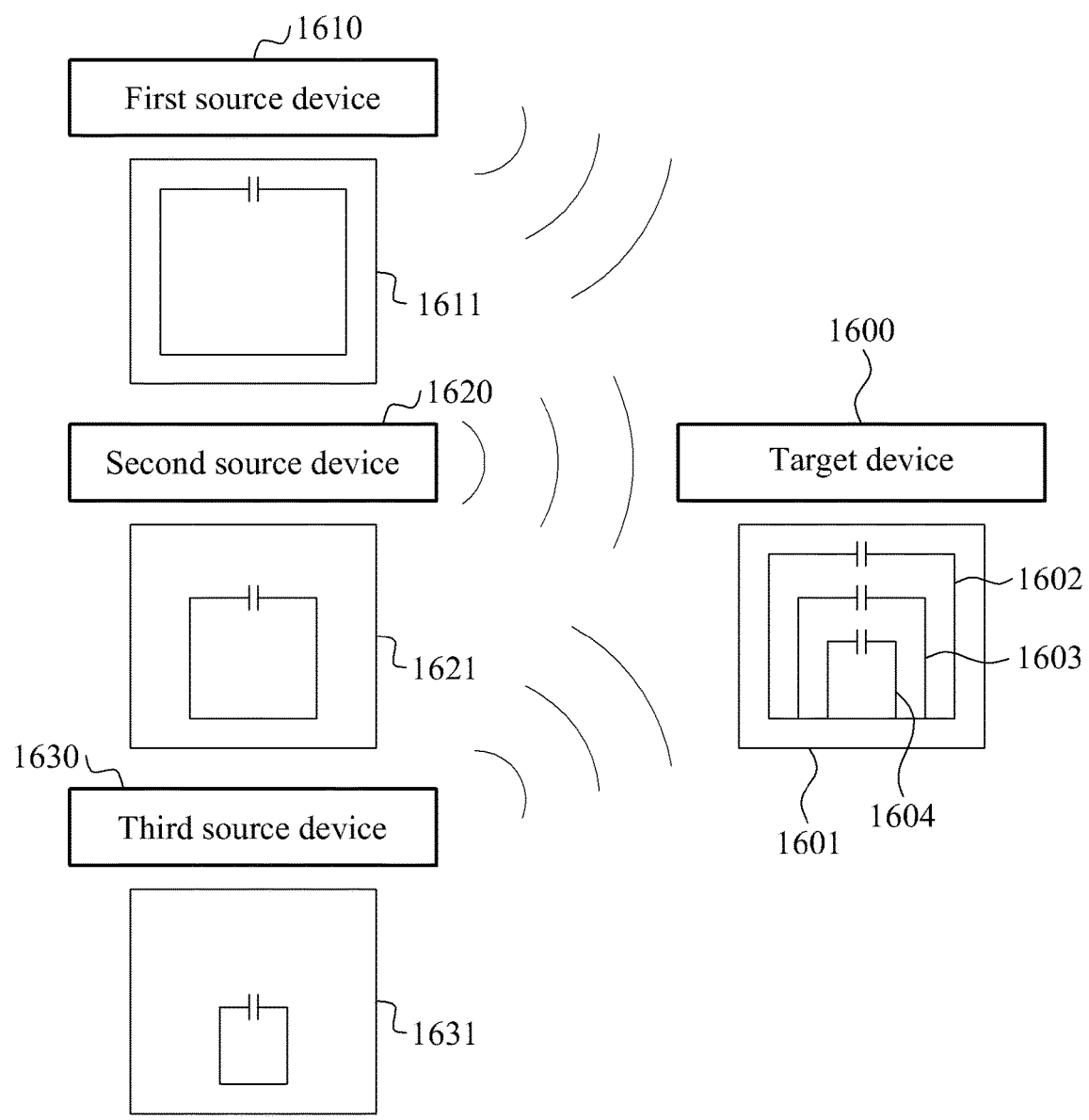
FIG. 16 illustrates another example of a wireless power transmission system.

FIG. 16 illustrates another example of a wireless power transmission system. In FIG. 16, the target device of FIG. 15 receives power from a plurality of source devices. Referring to FIG. 16, the wireless power transmission system includes a first source device 1610, a second source device 1620, a third source device 1630, and a target device 1600. The first source device 1610, the second source device 1620, the third source device 1630, and the target device 1600 may transmit and receive power using a source resonator 1611, a source resonator 1621, a source resonator 1631, and a target resonator 1601, respectively. Loop circuits respectively included in the source resonator 1611, the source resonator 1621, and the source resonator 1631 have different lengths.

The target device 1600 may change a length of a loop circuit used to receive a magnetic field depending on the source device transmitting the power. The target resonator 1601 of the target device 1600 may be connected to a capacitor, and may include a plurality of loop circuits having different lengths.

The target device 1600 selects a loop circuit to receive a magnetic field among a plurality of loop circuits included in the target resonator 1601 based on the length of the loop circuit included in the source resonator of the source device from which the target device 1600 intends to receive power. That is, the target device 1600 may receive magnetic fields having different magnitudes from the source devices 1610, 1620, and 1630 by controlling the magnitude of the magnetic field to be received by the target device 1600 based on the source device transmitting the power.

For example, when the target device 1600 receives power from the first source device 1610, the target device 1600 selects the loop circuit 1602 corresponding to the length of the loop circuit of the source resonator 1611 among the plurality of loop circuits included in the target resonator 1601. When the source resonator 1611 of the first source device 1610 generates the magnetic field, the target device 1600 receives the magnetic field generated by the source resonator 1611 using the loop circuit 1602.

When the target device 1600 receives power from the second source device 1620, the target device 1600 selects a loop circuit 1603 corresponding to the length of the loop circuit of the source resonator 1621 among the plurality of loop circuits included in the target resonator 1601. When the source resonator 1621 of the second source device 1620 generates the magnetic field, the target device 1600 receives the magnetic field generated by the source resonator 1621 using the loop circuit 1603.

When the target device 1600 receives power from the third source device 1630, the target device 1600 selects a loop circuit 1604 corresponding to the length of the loop circuit of the source resonator 1631 among the plurality of loop circuits included in the target resonator 1601. When the source resonator 1631 of the third source device 1630 generates the magnetic field, the target device 1600 receives the magnetic field generated by the source resonator 1631 using the loop circuit 1604.

Figure 17:
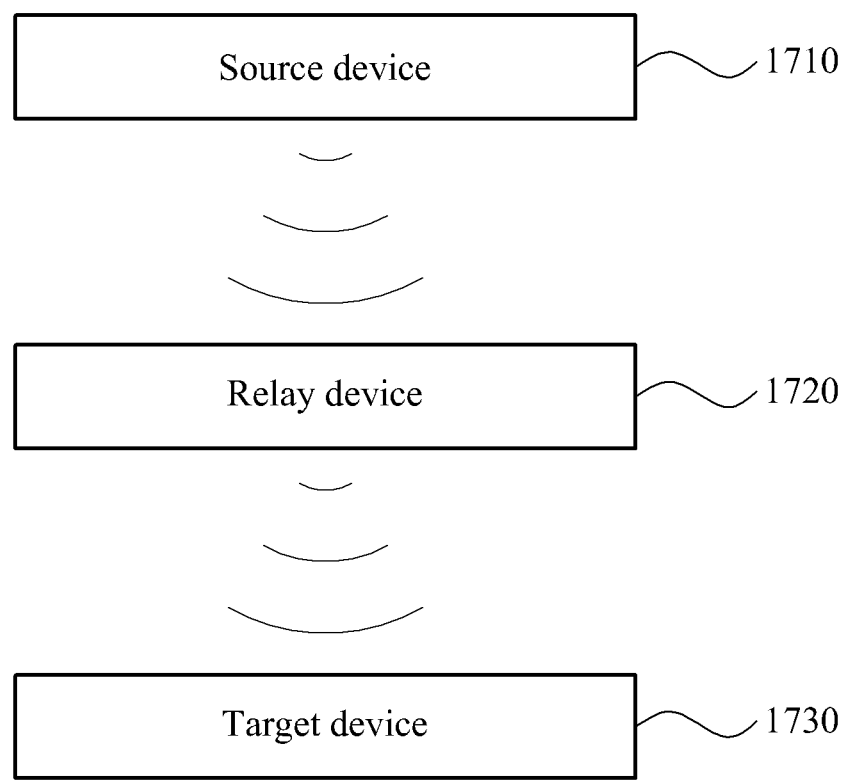
FIG. 17 illustrates another example of a wireless power transmission system.

FIG. 17 illustrates another example of a wireless power transmission system. Referring to FIG. 17, the wireless power transmission system includes a source device 1710, a relay device 1720, and a target device 1730. The source device 1710 and the target device 1730 may be the source device 900 of FIG. 9 and the target device 1500 of FIG. 15, respectively.

The relay device 1720 may generate a magnetic field that is the same as a magnetic field generated by the source device 1710 via a magnetic resonance with the source device 1710.

If the relay device 1720 is unable to change an input impedance of a relay resonator of the relay device 1720 and a magnitude of the magnetic field to be relayed by the relay device 1720, the source device 1710 may determine an input impedance of a source resonator of the source device 1710 and a magnitude of the magnetic field to be generated by the source device 1710 based on the input impedance of the relay resonator of the relay device 1720 and the magnitude of the magnetic field to be relayed by the relay device 1720. The target device 1730 may determine an input impedance of a target resonator of the target device 1730 and a magnitude of the magnetic field to be received by the target device 1730 based on the input impedance of the relay resonator of the relay device 1720 and the magnitude of the magnetic field to be relayed by the relay device 1720.

If the relay device 1720 is able to change the input impedance of the relay resonator of the relay device 1720 and the magnitude of the magnetic field to be relayed by the relay device 1720, the source device 1710, the target device 1730, and the relay device 1720 may each determine a wireless power transmission efficiency based on the input impedance and the magnitude of the magnetic field, and may determine the input impedance and the magnitude of the magnetic field to be used commonly by the source device

1710, the target device 1730, and the relay device 1720 based on the determined wireless power transmission efficiency.

A configuration and an operation of the relay device 1720 is described in further detail with reference to FIG. 18.

Figure 18:
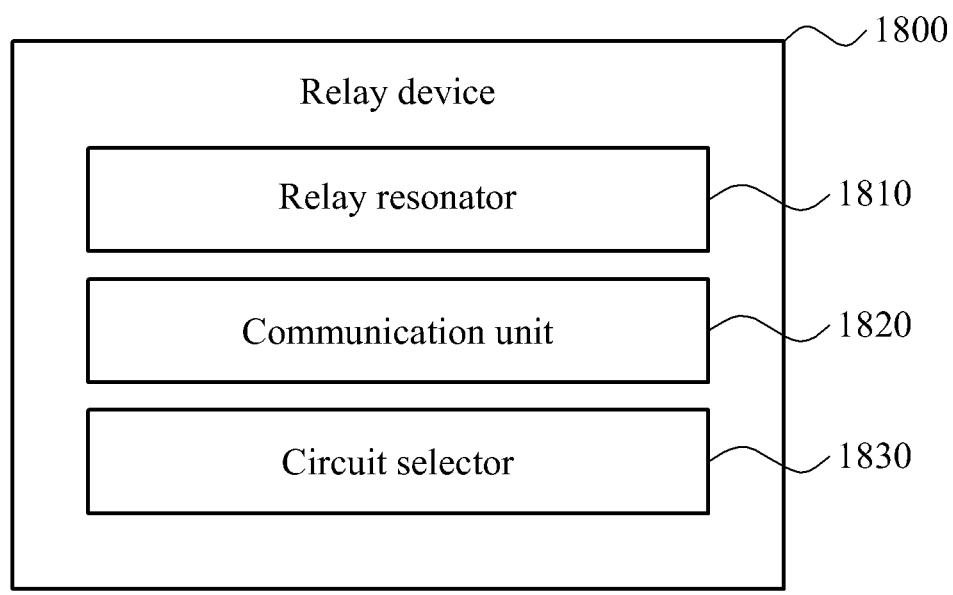
FIG. 18 illustrates an example of a structure of a relay device.

FIG. 18 illustrates an example of a structure of a relay device. The relay device 1800 may change a magnitude of a magnetic field to be relayed by a relay resonator of the relay device 1800 and an input impedance of the relay resonator. The relay device 1800 may improve a magnetic field relay efficiency of the relay device 1800 by adaptively changing the magnitude of the magnetic field to be relayed by the relay resonator based on a distance between a source device and the relay device 1800, a distance between the relay device 1800 and a target device, a magnitude of a magnetic field generated by the source device, and a magnitude of a magnetic field to be received by the target device. Also, the relay device 1800 may relay power between various source devices and various target devices by adaptively changing the input impedance of the relay device 1800 based on an input impedance of a source resonator included in the source device and an input impedance of a target resonator included in the target device. Referring to FIG. 18, the relay device 1800 includes a relay resonator 1810, a communication unit 1820, and a circuit selector 1830.

The relay resonator 1810 includes a plurality of loop circuits configured to relay different magnetic fields depending on a length of each of the plurality of loop circuits.

The plurality of loop circuits may include a plurality of capacitors corresponding to each of the plurality of loop circuits, a plurality of first switches to connect each of the plurality of capacitors to the plurality of loop circuits, and a plurality of second switches to supply a power to each of the plurality of loop circuits.

The relay device 1800 determines whether to turn ON the first switch or the second switch for each of the plurality of loop circuits.

For example, when the relay device 1800 turns ON the second switch of a first loop circuit, power generated by the relay resonator 1810 corresponding to the magnetic field received from the source device flows through the first loop circuit, thereby determining the input impedance of the relay resonator 1810 since the input impedance of the relay resonator 1810 depends on which one of the plurality of loop circuits is selected as the first loop circuit. Thus, the first loop circuit may be used as a feeder of the relay resonator 1810.

When the relay device 1800 turns on the first switch of a second loop circuit, the first switch connects a corresponding capacitor to the second loop circuit, thereby causing the second loop circuit to generate a magnetic field corresponding to the magnetic field received from the source device based on an inductance of the relay resonator 1810 determined by the first loop circuit and the second loop circuit and a capacitance of the capacitor connected to the second loop circuit.

The relay resonator 1810 may have a same configuration as any of the source resonators of FIGS. 11 through 14.

The communication unit 1820 may receive either one or both of information associated with the source device and information associated with the target device by communicating with either one or both of the source device and the target device.

The relay device 1800 may relay the magnetic field based on the information associated with the source device generating the magnetic field and the information associated with the target device receiving the relayed magnetic field. The information associated with the source device may include any one or any combination of location information of the source device, input impedance information of the source device, and magnitude information of the magnetic field generated by the source device. The information associated with the target device may include any one or any combination of location information of the target device, input impedance information of the target device, and magnitude information of the magnetic field received by the target device.

If the source device is able to change either one or both of the input impedance of the source device and the magnitude of the magnetic field to be generated by the source device, the relay device 1800 may receive, from the source device, information including either one or both of a range of the input impedance changeable by the source device and a range of the magnitude of the magnetic field that can be generated by the source device. The relay device 1800 may determine the input impedance of the source device based on the input impedance information of the target device. Also, the relay device 1800 may determine the magnitude of the magnetic field for maximum wireless power transmission efficiency based on the information received from the source device. The communication unit 1820 may transmit the determined input impedance and the determined magnitude of the magnetic field to the source device and the target device.

If the target device is able to change either one or both of the input impedance of the target device and the magnitude of the magnetic field to be received by the target device, the relay device 1800 may receive, from the target device, information including either one or both of a range of the input impedance changeable by the target device and a range of the magnitude of the magnetic field that can be received by the target device. The relay device 1800 may determine the input impedance of the target device based on the input impedance information of the source device. Also, the relay device 1800 may determine the magnitude of the magnetic field for maximum wireless power transmission efficiency based on the information received from the target device. The communication unit 1820 may transmit the determined input impedance and the determined magnitude of the magnetic field to the source device and the target device.

The circuit selector 1830 may select one loop circuit to relay a magnetic field among the plurality of loop circuits included in the relay resonator 1810 based on the information associated with the source device and the information associated with the target device.

The circuit selector 1830 may determine the input impedance of the relay resonator 1810 based on an input impedance of the source device and a capacitor included in the loop circuit selected to relay a magnetic field. The input impedance of the source device may be equal to the input impedance of the target device.

The circuit selector 1830 may select a loop circuit to be used as a feeder among the plurality of loop circuits included in the relay resonator 1810 based on the determined input impedance. The circuit selector 1830 may use the selected loop circuit as a feeder by turning ON the second switch of the selected loop circuit to enable a power generated by the loop circuit selected to relay a magnetic field to flow through the selected loop circuit. The input impedance of the relay resonator 1810 is determined by the selected loop circuit used as a feeder.

The circuit selector 1830 may determine the magnitude of the magnetic field to be relayed by the relay resonator 1810 based on the information associated with the source device and the information associated with the target device.

For example, the circuit selector 1830 may determine the magnitude of the magnetic field to be relayed by the relay resonator 1810 based on the magnitude of the magnetic field to be generated by the source device or the magnitude of the magnetic field to be received by the target device.

Also, the circuit selector 1830 may determine the magnitude of the magnetic field to be relayed by the relay resonator 1810 based on a distance between the relay device and the target device. The circuit selector 1830 may determine the distance between the target device and the relay device 1800 based on the location information of the target device, and may determine the magnitude of the magnetic field to be relayed by the relay resonator 1810 based on the determined distance.

For example, if the distance between the target device and the relay device 1800 is relatively great, the magnitude of the magnetic field to be received by the target device may be smaller than the magnitude of the magnetic field to be relayed by the relay resonator 1810 since the magnitude of a magnetic field decreases with distance. Accordingly, the circuit selector 1830 may determine the magnitude of the magnetic field to be relayed by the relay resonator 1810 to be greater than the magnitude of the magnetic field to be received by the target device.

Conversely, if the distance between the relay device 1800 and the target device is relatively small, the magnitude of the magnetic field relayed by the relay device 1800 may be equal to the magnitude of the magnetic field received by the target device. Accordingly, the circuit selector 1830 may determine the magnitude of the magnetic field to be relayed by the relay resonator 1810 to be equal to the magnitude of the magnetic field to be received by the target device.

The circuit selector 1830 may select one loop circuit to relay a magnetic field among the plurality of loop circuits included in the relay resonator 1810 based on the determined magnitude of the magnetic field to be relayed by the relay resonator 1810. The circuit selector 1830 may select one loop circuit to be used as a feeder among the remaining loop circuits of the relay resonator 1810 excluding the loop circuit selected to generate a magnetic field based on the determined input impedance of the relay resonator 1810.

The circuit selector 1830 may turn ON the first switch of the loop circuit selected to relay a magnetic field to enable the relay resonator 1810 to relay a magnetic field corresponding to the loop circuit selected to relay the magnetic field. The circuit selector 1830 may turn ON the second switch of the loop circuit selected to be used as a feeder to enable the loop selected to be used as a feeder to operate as a feeder of the relay resonator 1810.

Figure 19:
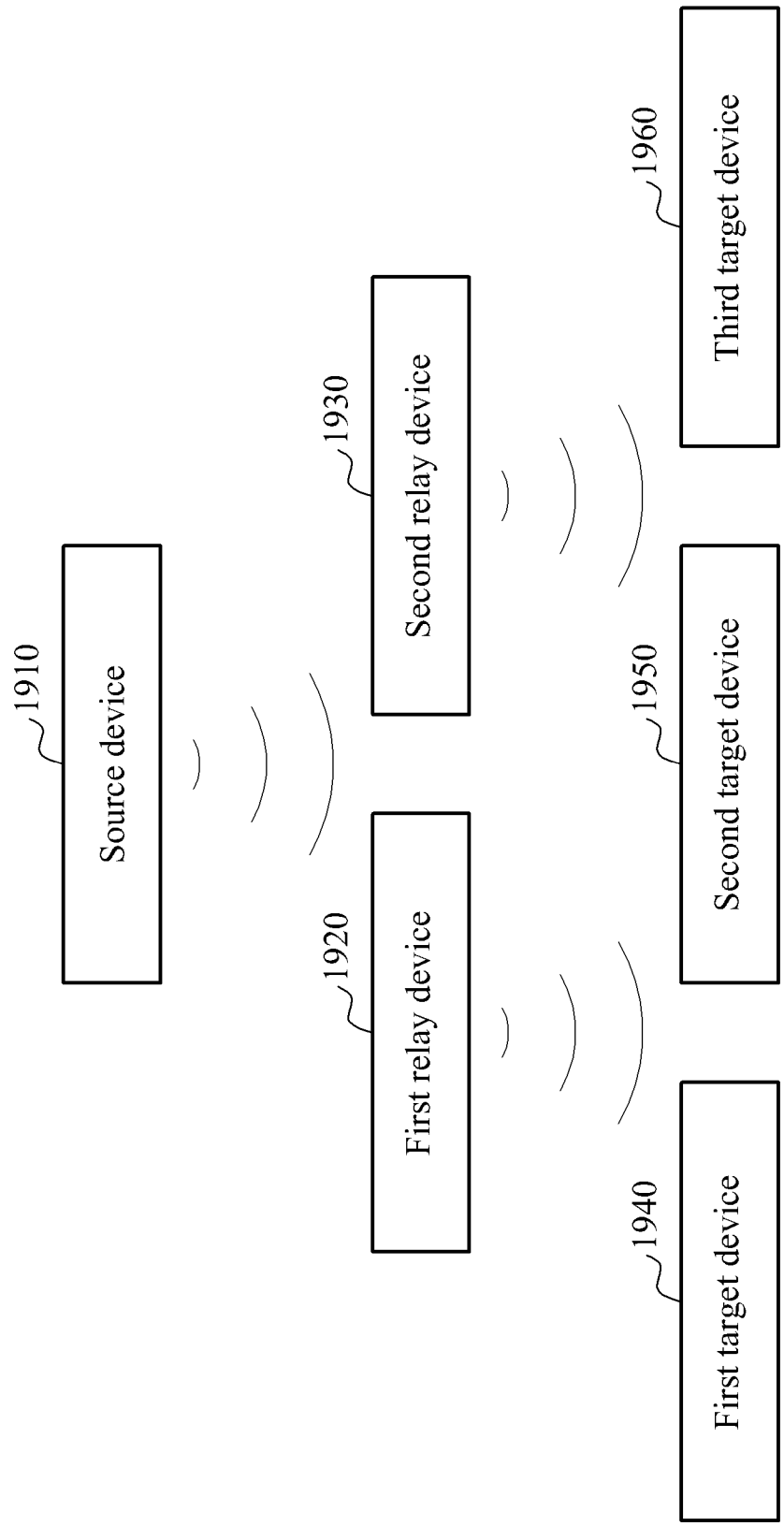
FIG. 19 illustrates another example of a wireless power transmission system.

FIG. 19 illustrates another example of a wireless power transmission system. An example of three target devices receiving power from one source device using two relay devices is illustrated. Referring to FIG. 19, the wireless power transmission system includes a source device 1910, a first relay device 1920, a second relay device 1930, a first target device 1940, a second target device 1950, and a third target device 1960.

The source device 1910 transmits a test power to each of the first target device 1940, the second target device 1950, and the third target device 1960. The source device 1910 may change a channel used to transmit the test power. The source device 1910 transmits the test power to each of the first target device 1940, the second target device 1950, and the third target device 1960 via the first relay device 1920, and transmits the test power to each of the first target device 1940, the second target device 1950, and the third target device 1960 via the second relay device 1930, using a magnetic field having a same magnitude for each transmission of the test power.

The source device 1910 receives information about a transmission result of the test power from the first target device 1940, the second target device 1950, and the third target device 1960. The information received by the source device 1910 may include magnitude information of the magnetic field received by the first target device 1940, the second target device 1950, and the third target device 1960, and relay device information of the relay device that relayed the magnetic field.

The source device 1910 determines a magnetic field transmission efficiency for each of the first target device 1940, the second target device 1950, and the third target device 1960 based on the received information.

The source device 1910 generates a magnetic field based on the determined magnetic field transmission efficiency.

For example, an efficiency in transmitting the magnetic field from the source device 1910 to the first target device 1940 using the second relay device 1930, an efficiency in transmitting the magnetic field from the source device 1910 to the second target device 1950 using the first relay device 1920, and an efficiency in transmitting the magnetic field from the source device 1910 to the third target device 1960 using the second relay device 1930 may be in a descending order. Accordingly, the source device 1910 may change an input impedance and a magnitude of a magnetic field of a source resonator of the source device 1910 and an input impedance and a magnitude of a magnetic field of the second relay device 1930 based on an input impedance and a magnitude of a magnetic field of the first target device 1940, and may generate a magnetic field corresponding to the input impedance and the magnitude of the magnetic field of the first target device 1940 based on the magnitude of the magnetic field received by the first target device 1940.

After the source device 1910 completes the power transmission to the first target device 1940, the source device 1910 may generate a magnetic field corresponding to the second target device 1950.

After the source device 1910 completes the power transmission to the second target device 1950, the source device 1910 may generate a magnetic field corresponding to the third target device 1960.

Figure 20:
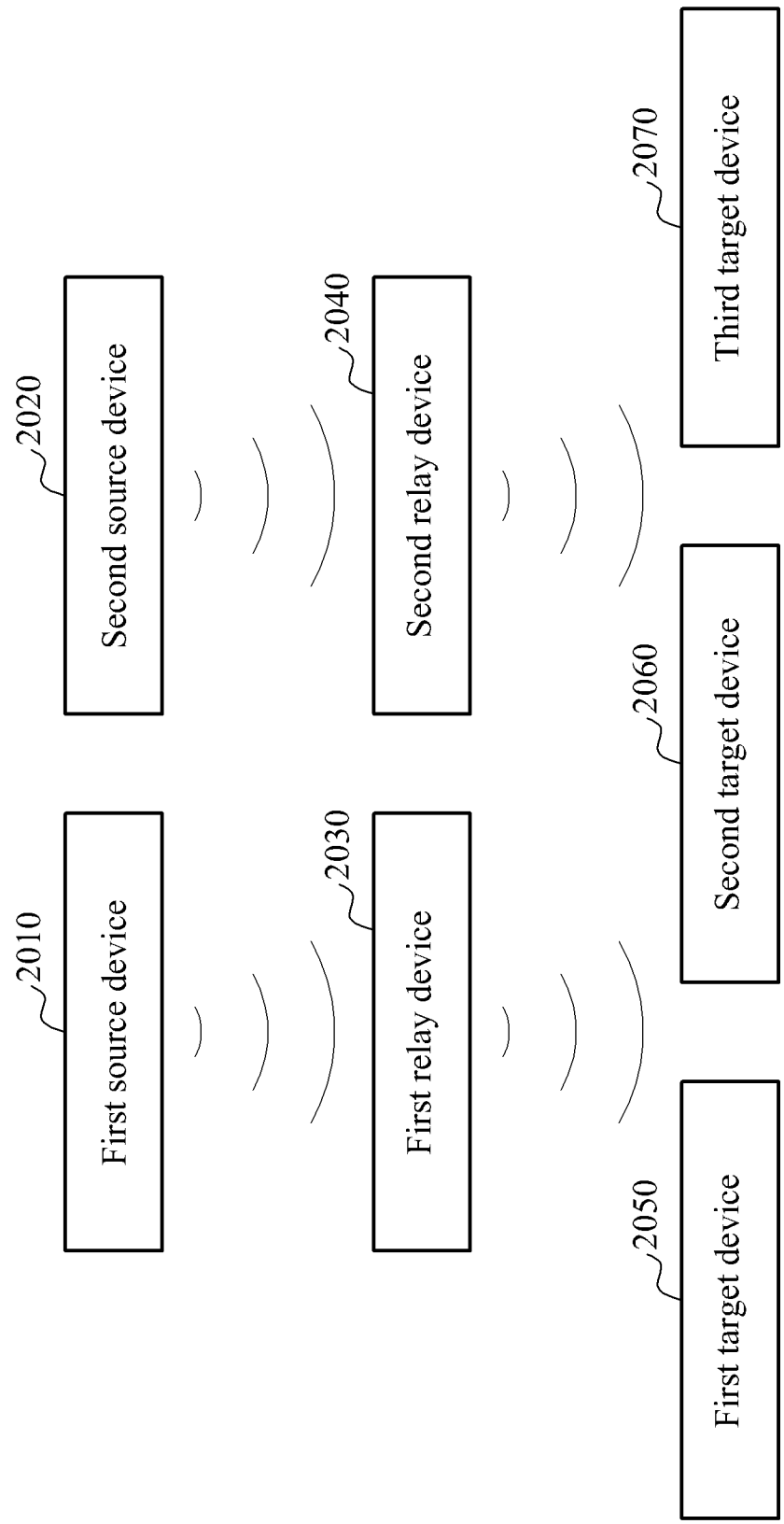
FIG. 20 illustrates another example of a wireless power transmission system.

FIG. 20 illustrates another example of a wireless power transmission system. An example of three target devices receiving power from two source devices using two relay devices is illustrated. Referring to FIG. 20, the wireless power transmission system includes a first source device 2010, a second source device 2020, a first relay device 2030, a second relay device 2040, a first target device 2050, a second target device 2060, and a third target device 2070.

The first source device 2010 and the second source device 2020 each transmit a test power to each of the first target device 2050, the second target device 2060, and the third target device 2070. The first source device 2010 and the second source device 2020 may change a channel used to transmit the test power. The first source device 2010 and the second source device 2020 each transmit the test power to each of the first target device 2050, the second target device 2060, and the third target device 2070 via the first relay device 2030, and each transmit the test power to each of the first target device 2050, the second target device 2060, and the third target device 2070 via the second relay device 2040, using a magnetic field having a same magnitude for each transmission of the test power.

The first target device 2050, the second target device 2060, and the third target device 2070 compare the test power received from each of the first source device 2010 and the second source device 2020, and select whichever one of the first source device 2010 and the second source device 2020 has a higher magnetic field transmission efficiency.

The first source device 2010 and the second source device 2020 receive information about a transmission result of the test power from the first target device 2050, the second target device 2060, and the third target device 2070. The information received by the first source device 2010 and the second source device 2020 may include magnitude information of the magnetic field received by the first target device 2050, the second target device 2060, and the third target device 2070, relay device information of the relay device that relayed the magnetic field, and source device information of the source device selected by the first target device 2050, the second target device 2060, and the third target device 2070.

The first source device 2010 and the second source device 2020 each determine a magnetic field transmission efficiency for each of the first target device 2050, the second target device 2060, and the third target device 2070 based on the received information.

The first source device 2010 and the second source device 2020 each may generate a magnetic field based on the determined magnetic field transmission efficiency.

For example, an efficiency in transmitting the magnetic field from the first source device 2010 to the first target device 2050 using the second relay device 2040, an efficiency in transmitting the magnetic field from the first source device 2010 to the second target device 2060 using the first relay device 2030, and an efficiency in transmitting the magnetic field from the first source device 2010 to the third target device 2070 using the second relay device 2040 may be in a descending order. Also, an efficiency in transmitting the magnetic field from the second source device 2020 to the second target device 2060 using the first relay device 2030, an efficiency in transmitting the magnetic field from the second source device 2020 to the first target device 2050 using the first relay device 2030, and an efficiency in transmitting the magnetic field from the second source device 2020 to the third target device 2070 using the second relay device 2040 may be in a descending order. An efficiency in transmitting the magnetic field from the first source device 2010 to the first target device 2050 and the third target device 2070 may be higher than an efficiency in transmitting the magnetic field from the second source device 2020 to the first target device 2050 and the third target device 2070. Also, an efficiency in transmitting the magnetic field from the second source device 2020 to the second target device 2060 may be higher than an efficiency in transmitting the magnetic field from the first source device 2010 to the second target device 2060. Therefore, the first source device 2010 may transmit power only to the first target device 2050 and the third target device 2070 via the second relay device 2040, and the second source device 2020 may transmit power only to the second target device 2060 via the first relay device 2030.

Accordingly, the first source device 2010 may change an input impedance of a source resonator and a magnitude of a magnetic field of the first source device 2010 and an input impedance and a magnitude of a magnetic field of the second relay device 2040 based on a magnitude of a magnetic field and an input impedance of the first target device 2050, and may generate a magnetic field corresponding to the input impedance and the magnitude of the magnetic field of the first target device 2050 based on the magnitude of the magnetic field received by the first target device 2050.

After the first source device 2010 completes the power transmission to the first target device 2050, the first source device 2010 may generate a magnetic field corresponding to the third target device 2070.

Also, second source device 2020 may change an input impedance and a magnitude of a magnetic field of a source resonator of the second source device 2020 and an input impedance and a magnitude of a magnetic field of the first relay device 2030 based on an input impedance and a magnitude of a magnetic field of the second target device 2060, and may generate a magnetic field corresponding to the input impedance and the magnitude of the magnetic field of the second target device 2060 based on the magnitude of the magnetic field received by the second target device 2060.

That is, when a plurality of source devices is present, the wireless power transmission system may enhance a magnetic field transmission efficiency by selecting a source device to generate a magnetic field to be received by a target device based on the magnetic field transmission efficiency, and generating a magnetic field corresponding to the target device in the selected source device.

Figure 21:
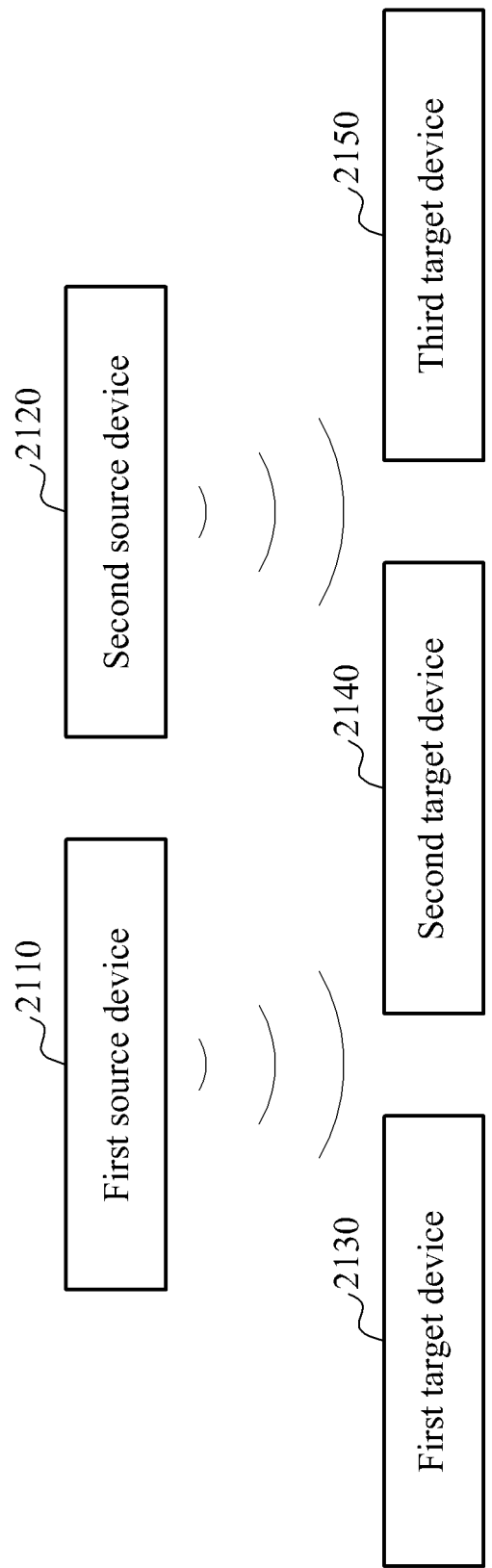
FIG. 21 illustrates another example of a wireless power transmission system.

FIG. 21 illustrates another example of a wireless power transmission system. An example of three target devices receiving power from two source devices is illustrated. Referring to FIG. 21, the wireless power transmission system includes a first source device 2110, a second source device 2120, a first target device 2130, a second target device 2140, and a third target device 2150.

The first source device 2110 and the second source device 2120 each transmit a test power to each of the first target device 2130, the second target device 2140, and the third target device 2150. The first target device 2130, the second target device 2140, and the third target device 2150 each compare the test power received from each of the first source device 2110 and the second source device 2120, and select whichever one of the first source device 2110 and the second source device 2120 has a higher magnetic field transmission efficiency.

The first source device 2110 and the second source device 2120 each receive information about a transmission result of the test power from the first target device 2130, the second target device 2140, and the third target device 2150. The information received by the first source device 2110 and the second source device 2120 may include magnitude information of the magnetic field received by the first target device 2130, the second target device 2140, and the third target device 2150, and source device information of the source device selected by the first target device 2130, the second target device 2140, and the third target device 2150.

The first source device 2110 and the second source device 2120 each determine a magnetic field transmission efficiency for each of the first target device 2130, the second target device 2140, and the third target device 2150 based on the received information.

The first source device 2110 and the second source device 2120 each may generate a magnetic field based on the determined magnetic field transmission efficiency.

For example, an efficiency in transmitting the magnetic field from the first source device 2110 to the first target device 2130, an efficiency in transmitting the magnetic field from the first source device 2110 to the second target device 2140, and an efficiency in transmitting the magnetic field from the first source device 2110 to the third target device 2150 may be in a descending order. Also, an efficiency in transmitting the magnetic field from the second source device 2120 to the second target device 2140, an efficiency in transmitting the magnetic field from the second source device 2120 to the first target device 2130, and an efficiency in transmitting the magnetic field from the second source device 2120 to the third target device 2150 may be in a descending order. An efficiency in transmitting the magnetic field from the first source device 2110 to the first target device 2130 and the third target device 2150 may be higher than an efficiency in transmitting the magnetic field from the second source device 2120 to the first target device 2130 and the third target device 2150. Also, an efficiency in transmitting the magnetic field from the second source device 2120 to the second target device 2140 may be higher than an efficiency in transmitting the magnetic field from the first source device 2110 to the second target device 2140. Therefore, the first source device 2110 may transmit power only to the first target device 2130 and the third target device 2150, and the second source device 2120 may transmit power only to the second target device 2140.

Accordingly, the first source device 2110 may change an input impedance and a magnitude of a magnetic field of a source resonator of the first source device 2110 based on an input impedance and a magnitude of a magnetic field of the first target device 2130, and may generate a magnetic field corresponding to the input impedance and the magnitude of the magnetic field of the first target device 2130 based on the magnitude of the magnetic field received by the first target device 2130.

After the first source device 2110 completes the power transmission to the first target device 2130, the first source device 2110 may generate a magnetic field corresponding to the third target device 2150.

Also, the second source device 2120 may change an input impedance and a magnitude of a magnetic field of a source resonator of the second source device 2120 based on an input impedance and a magnitude of a magnetic field of the second target device 2140, and may generate a magnetic field corresponding to the input impedance and the magnitude of the magnetic field of the second target device 2140 based on the magnitude of the magnetic field received by the second target device 2140.

That is, when a plurality of source devices is present, the wireless power transmission system may enhance a magnetic field transmission efficiency by selecting a source device to generate a magnetic field to be received by a target device based on the magnetic field transmission efficiency, and generating a magnetic field corresponding to the target device in the selected source device.

Figure 22:
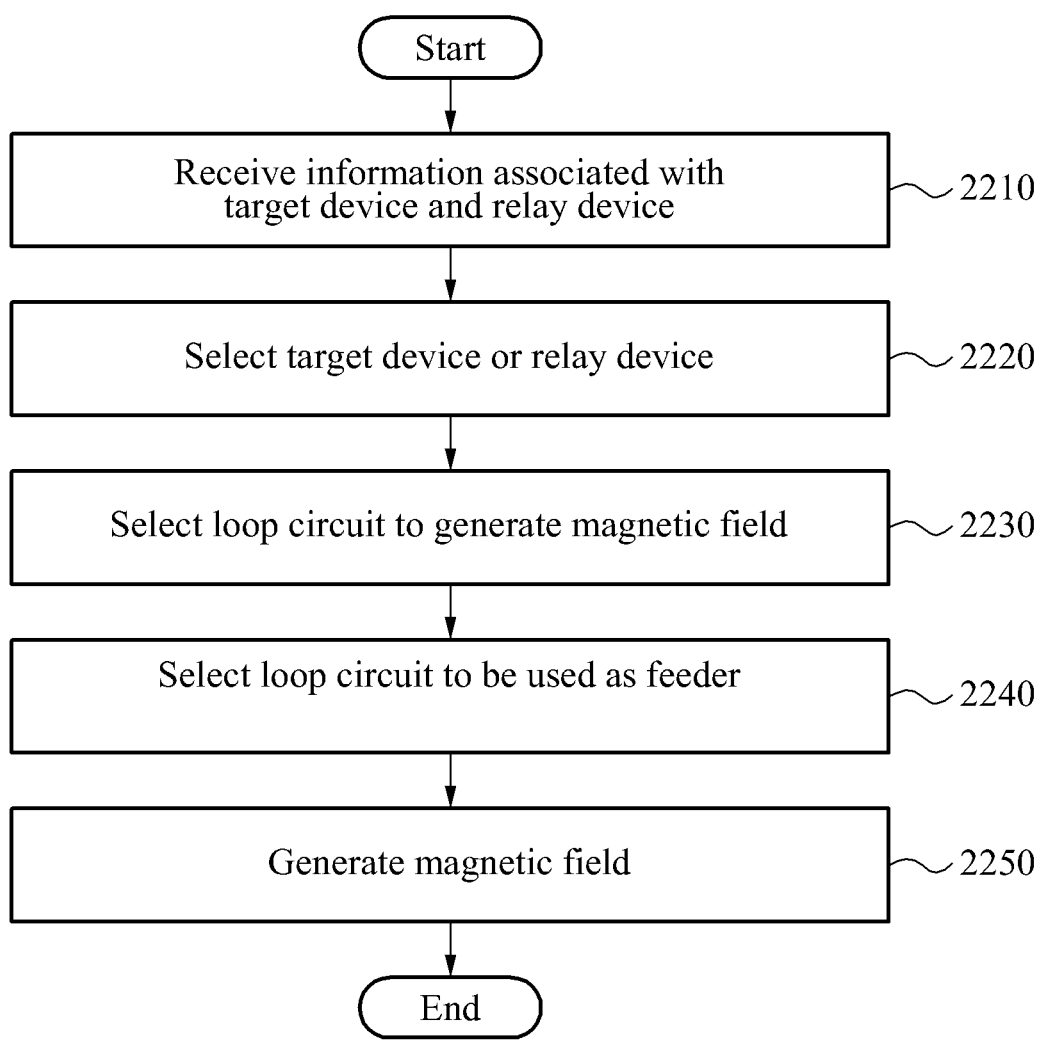
FIG. 22 illustrates an example of a method of operating a source device.

FIG. 22 illustrates an example of a method of operating a source device. Referring to FIG. 22, in 2210, the communication unit 920 receives either one or both of information associated with a target device and information associated with a relay device by communicating with either one or both of the source device and the target device.

The information associated with the target device may include location information of the target device, input impedance information of the target device, and magnitude information of a magnetic field to be received by the target device. When a relay device to relay power between the source device 900 and the target device is present, the communication unit 920 may receive, from the relay device, information associated with the relay device. The information associated with the relay device may include any one or any combination of distance information between the relay device and the source resonator 910, magnitude information of the magnetic field relayed by the relay device, information associated with the target device to which the relay device relays power, and input impedance information of the relay device.

In 2220, the circuit selector 930 may select one device among at least one target device and the relay device based on the information associated with the target device or the relay device received in 2210. The circuit selector 930 may determine a magnetic field transmission efficiency for each of the target device and the relay device based on information received in 2210, and may select one of the target device and the relay device based on the determined result.

In 2230, the circuit selector 930 may select one loop circuit among the plurality of loop circuits included in the source resonator 910 based on the information associated with the target device or the relay device selected in 2220.

The circuit selector 930 may determine a magnitude of a magnetic field to be generated by the source resonator 910 based on the information associated with the target device or the relay device selected in 2220. The circuit selector 930 may select one loop circuit among the plurality of loop circuits included in the source resonator 910 based on the determined magnitude of the magnetic field.

In 2240, the circuit selector 930 may select one loop circuit among the plurality of loop circuits included in the source resonator 910 based on the information associated with the target device or the relay device selected in 2220.

The circuit selector 930 may determine an input impedance of the source resonator 910 based on an input impedance of the selected target device or the selected relay device. The circuit selector 930 may select a loop circuit to be used as a feeder among the plurality of loop circuits included in the source resonator 910 based on the determined input impedance. The circuit selector 930 may select one loop circuit among the remaining loop circuits other than the loop circuit selected in 2230.

In 2250, the circuit selector 930 may enable the source resonator 910 to generate a magnetic field using the loop circuit selected in 2240 and the loop circuit selected in 2230.

That is, the circuit selector 930 may use the loop circuit selected in 2240 as a feeder by turning ON the second switch included in the selected loop circuit to pass the supplied power through the selected loop circuit. The input impedance of the source resonator 910 may be determined based on the loop circuit used as a feeder. The circuit selector 930 may control the first switch included in the loop circuit selected in 2230 to enable the source resonator 910 to generate a magnetic field corresponding to the selected loop circuit.

Figure 23:
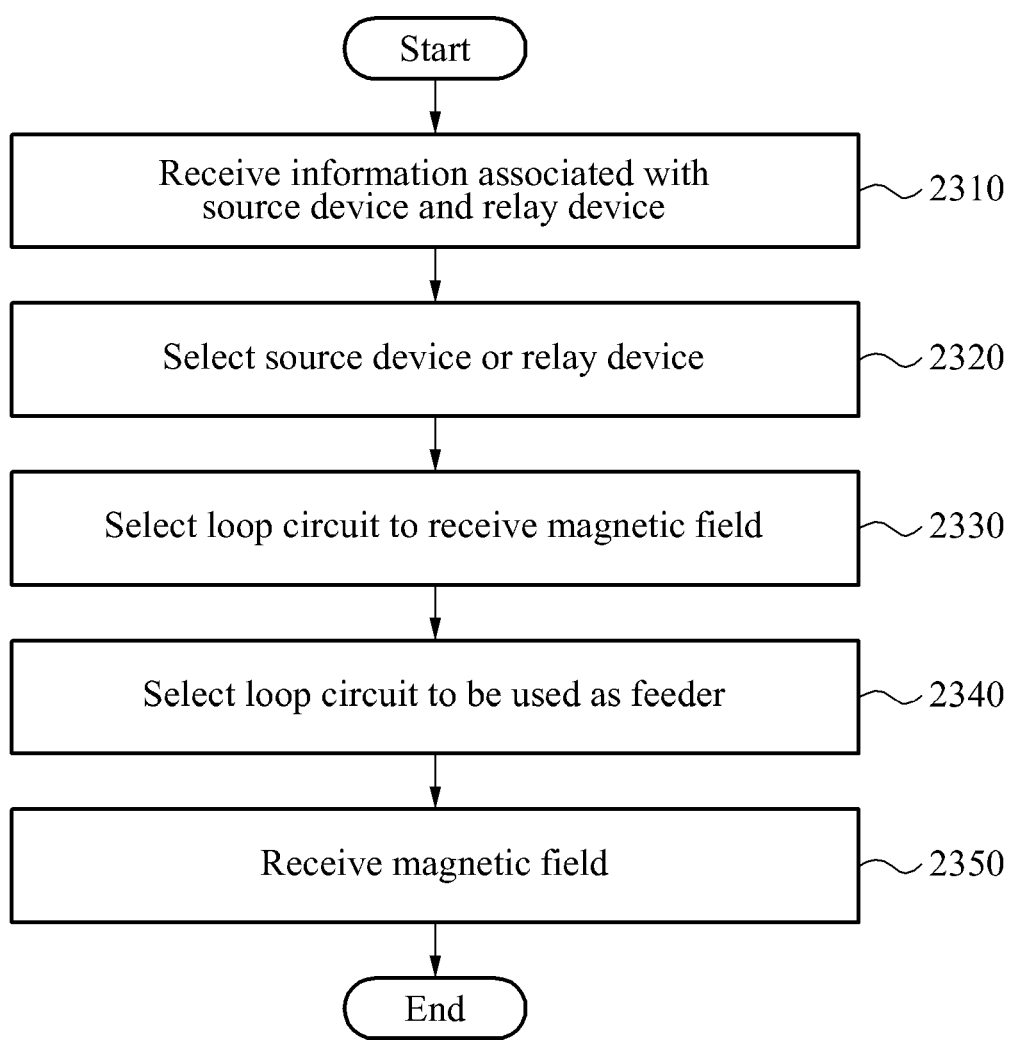
FIG. 23 illustrates an example of a method of operating a target device.

FIG. 23 illustrates an example of a method of operating a target device. Referring to FIG. 23, in 2310, the communication unit 1520 may receive either one or both of information associated with a source device and information associated with a relay device by communicating with either one or both of the source device and the target device.

The information associated with the source device may include any one or any combination of location information of the source device, input impedance information of the source device, and magnitude information of a magnetic field generated by the source device. When a relay device to relay power between the source device 900 and the target device is present, the communication unit 1520 may receive, from the relay device, information associated with the relay device. The information associated with the relay device may include any one or any combination of distance information between the relay device and the target device, magnitude information of the magnetic field relayed by the relay device, information associated with the source device from which the relay device relays power, and input impedance information of the relay device.

In 2320, the circuit selector 1530 selects one device among at least one source device and the relay device based on the information associated with the source device or the relay device received in 2310. The circuit selector 1530 may determine a magnetic field transmission efficiency for each of the source device and the relay device based on information received in 2310, and may select one of the source device and the relay device based on the determined result.

In 2330, the circuit selector 1530 selects one loop circuit among the plurality of loop circuits included in the target resonator 1510 based on the information associated with the source device or the relay device selected in 2320.

The circuit selector 1530 may determine the magnitude of the magnetic field to be received by the target resonator 1510 based on the information associated with the source device or the relay device selected in 2320. The circuit selector 1530 may select one loop circuit among the plurality of loop circuits included in the target resonator 1510 based on the determined magnitude of the magnetic field.

The circuit selector 1530 may determine an input impedance of the target resonator 1510 based on an input impedance of the source device or relay device selected in 2320 and a capacitor included in the loop circuit selected in 2330. The circuit selector 1530 may select a loop circuit to be used as a feeder among the plurality of loop circuits included in the target resonator 1510 based on the determined input impedance. The circuit selector 1530 may select one loop circuit among the remaining loop circuits, other than the loop circuit selected in 2330.

In 2350, the circuit selector 1530 may enable the target resonator 1510 to receive a magnetic field using the loop circuit selected in 2340 and the loop circuit selected in 2330.

That is, the circuit selector 1530 uses the loop circuit selected in 2340 as a feeder by turning ON the second switch included in the loop circuit selected in 2340 to enable the supplied power to flow through the selected loop circuit. The input impedance of the target resonator 1510 is determined by the selected loop circuit used as a feeder. The circuit selector 1530 controls the first switch included in the loop circuit selected in 2330 to enable the target resonator 1510 to generate a magnetic field corresponding to the loop circuit selected in 2330.

Figure 24:
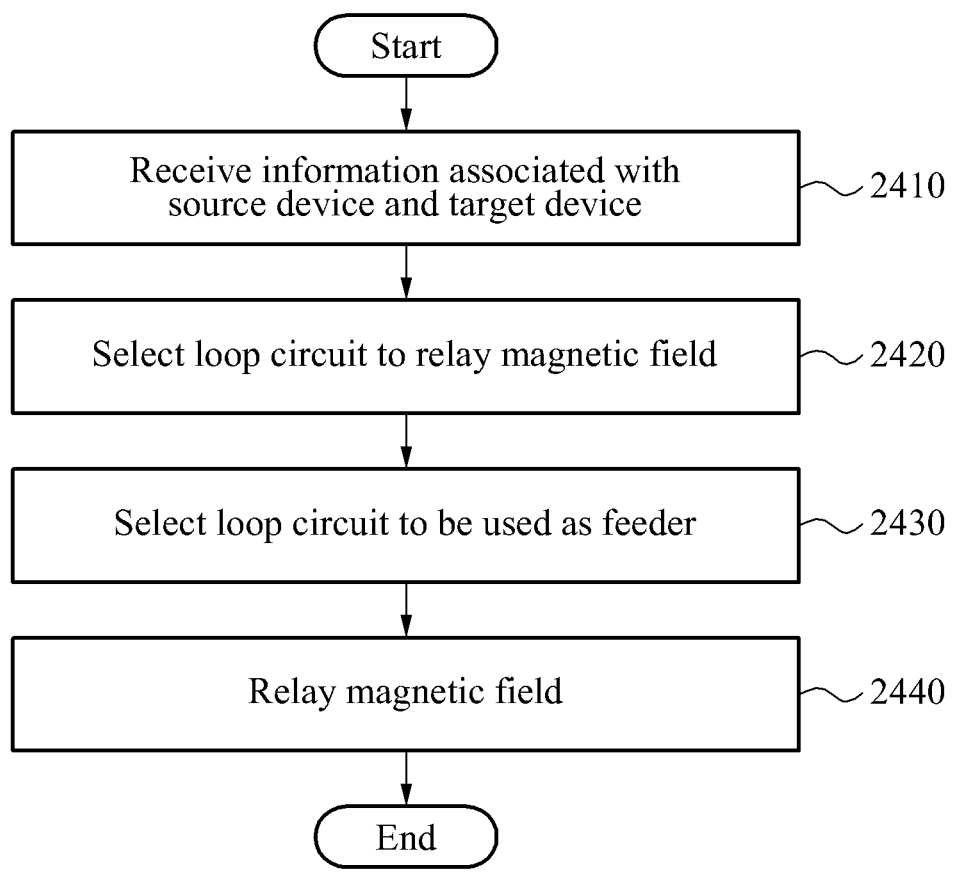
FIG. 24 illustrates an example of a method of operating a relay device.

FIG. 24 illustrates an example of a method of operating a relay device. Referring to FIG. 24, in 2410, the communication unit 1820 receives either one or both of information associated with a source device and information associated with a target device by communicating with either one or both of the source device and the target device.

The information associated with the source device may include location information of the source device, input impedance information of the source device, and magnitude information of a magnetic field generated by the source device. The information associated with the target device may include any one or any combination of distance information between the relay device and the target device, magnitude information of the magnetic field received by the target device, and input impedance information of the target device.

In 2420, the circuit selector 1830 may select one loop circuit among the plurality of loop circuits included in the relay resonator 1810 based on the information associated with the source device and the target device received in 2410.

The circuit selector 1830 may determine the magnitude of the magnetic field to be relayed by the relay resonator 1810 based on the information associated with the source device and the target device received in 2410. The circuit selector 1830 may select one loop circuit among the plurality of loop circuits included in the relay resonator 1810 based on the determined magnitude of the magnetic field.

In 2430, the circuit selector 1830 may select one loop circuit among the plurality of loop circuits included in the relay resonator 1810 based on the information associated with the source device and the target device received in 2410.

The circuit selector 1830 may determine an input impedance of the target resonator 1510 based on an input impedance of the relay resonator 1810 based on an input impedance of the source device transmitting the information associated with the source device and an input impedance of the target device transmitting the information associated with the target device in 2410 and a capacitor included in the loop circuit selected in 2420. The circuit selector 1830 may select a loop circuit to be used as a feeder among the plurality of loop circuits included in the relay resonator 1810 based on the determined input impedance. The circuit selector 1830 may select one loop circuit among the remaining loop circuits other than the loop circuit selected in 2420.

In 2440, the circuit selector 1830 may enable the relay resonator 1810 to relay the magnetic field using the loop circuit selected in 2430, and the loop circuit selected in 2420.

That is, the circuit selector 1830 may use the loop circuit selected in 2430 as a feeder by turning ON the second switch included in the selected loop circuit to power to flow through the selected loop circuit. The input impedance of the relay resonator 1810 may be determined based on the loop circuit used as a feeder. The circuit selector 1830 may control the first switch included in the loop circuit selected in 2420 to enable the relay resonator 1810 to relay a magnetic field corresponding to the selected loop circuit.

The TX controller 114, the communication units 115, 920, 1520, and 1820, the RX controller 125, the MCU, the communication/tracking units 811 and 823, and the circuit selectors 930, 1140, 1230, 1330, 1430, 1530, and 1830 in FIGS. 1, 8, 9, 11-15, and 18 described above that perform the operations illustrated in FIGS. 22-24 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A source device transmitting a wireless power to a target device, the source device comprising:
   a source resonator comprising a plurality of loop circuits respectively configured to generate different magnetic fields each depending on a length of a corresponding one of the plurality of loop circuits; and
   a circuit selector configured to select one loop circuit among the plurality of loop circuits based on information associated with the target device,
   wherein the source resonator further comprises:
      a plurality of capacitors respectively corresponding to the plurality of loop circuits; and
      a plurality of first switches respectively corresponding to the plurality of loop circuits and each configured to connect a corresponding one of the plurality of capacitors to a corresponding one of the plurality of loop circuits.

2. The source device of claim 1, wherein the circuit selector is further configured to control the first switch corresponding to the selected loop circuit to connect the capacitor corresponding to the selected loop circuit to the selected loop circuit to cause the selected loop circuit to generate a magnetic field corresponding to the selected loop circuit.

3. The source device of claim 1, wherein each of the plurality of capacitors has a capacitance determined based on the length of the loop circuit to which the capacitor corresponds.

4. The source device of claim 1, wherein the circuit selector is further configured to:
   determine a magnitude of a magnetic field to be generated by the source resonator based on the information associated with the target device; and
   select the one loop circuit among the plurality of loop circuits based on the determined magnitude of the magnetic field.

5. The source device of claim 4, wherein the information associated with the target device comprises distance information of a distance between the target device and the source device; and
   the circuit selector is further configured to determine the magnitude of the magnetic field to be generated by the source resonator based on the information of the distance between the target device and the source device.

6. The source device of claim 4, wherein the information associated with the target device comprises magnitude information of a magnetic field to be received by the target device; and
   the circuit selector is further configured to determine the magnitude of the magnetic field to be generated by the source resonator based on the magnitude information of the magnetic field to be received by the target device.

7. The source device of claim 1, wherein the source resonator comprises a plurality of second switches respectively corresponding to the plurality of loop circuits and each configured to supply a power to a corresponding one of the plurality of loop circuits.

8. The source device of claim 7, wherein the circuit selector is further configured to:
   select a loop circuit to be used as a feeder among the plurality of loop circuits based on an input impedance of the target device; and
   control the second switch corresponding to the selected loop circuit to supply the power to the selected loop circuit.

9. The source device of claim 1, further comprising a communication unit configured to receive either one or both of the information associated with the target device and information associated with a relay device by communicating with either one or both of the target device and the relay device.

10. The source device of claim 9, wherein the circuit selector is further configured to:
    select either the target device or the relay device to receive a magnetic field transmitted by the source device based on the received information; and
    select the one loop circuit among the plurality of loop circuits based on a result of the selecting of either the target device or the relay device.

11. The source device of claim 9, wherein the information associated with the relay device comprises any one or any combination of distance information of a distance between the relay device and the source device, information associated with the target device to which the relay device relays the magnetic field, and input impedance information of the relay device.

12. The source device of claim 9, wherein the circuit selector is further configured to:
    determine a magnetic field transmission efficiency for each of the target device and the relay device based on the received information; and
    select either the target device or the relay device based on the determined magnetic field transmission efficiencies.

13. A target device receiving a wireless power from source device, the target device comprising:
    a target resonator comprising a plurality of loop circuits respectively configured to receive different magnetic fields each depending on a length of a corresponding one of the plurality of loop circuits; and
    a circuit selector configured to select one loop circuit among the plurality of loop circuits based on information associated with the source device,
    wherein the target resonator comprises:
       a plurality of capacitors respectively corresponding to the plurality of loop circuits; and
       a plurality of first switches respectively corresponding to the plurality of loop circuits and each configured to connect a corresponding one of the plurality of capacitors to a corresponding one of the plurality of loop circuits.

14. The target device of claim 13, wherein the information associated with the source device comprises distance information of a distance between the source device and the target device; and
    the circuit selector is further configured to select the one loop circuit among the plurality of loop circuits based on the distance information of the distance between the source device and the target device.

15. The target device of claim 13, wherein the information associated with the source device comprises magnitude information of a magnetic field generated by the source device; and
    the circuit selector is further configured to select the one loop circuit among the plurality of loop circuits based on the magnitude information of the magnetic field generated by the source device.

16. The target device of claim 13, wherein the target resonator comprises a plurality of second switches respectively corresponding to the plurality of loop circuits and each configured to supply a power generated by the target resonator to a corresponding one of the plurality of loop circuits.

17. The target device of claim 16, wherein the circuit selector is further configured to:
    select a loop circuit to be used as a feeder among the plurality of loop circuits based on an input impedance of the source device; and
    control the second switch corresponding to the selected loop circuit to supply the power generated by the target resonator to the selected loop circuit.

18. The target device of claim 13, further comprising a communication unit configured to receive either one or both of the information associated with the source device and information associated with a relay device by communicating with either one or both of the source device and the relay device.

19. The target device of claim 18, wherein the circuit selector is further configured to:
    select either the source device or the relay device as a device from which the target device is to receive a magnetic field based on the received information; and
    select one loop circuit among the plurality of loop circuits based on a result of the selecting of either the source device or the relay device.

20. The target device of claim 18, wherein the circuit selector is further configured to:

determine a magnetic field reception efficiency for each of the source device and the relay device based on the received information; and select either the source device or the relay device based on the determined magnetic field reception efficiencies.

21. A relay device relaying a wireless power from a source device to a target device, the relay device comprising:
- a relay resonator comprising a plurality of loop circuits respectively configured to relay different magnetic fields each depending on a length of a corresponding one of the plurality of loop circuits; and
- a circuit selector configured to select one loop circuit among the plurality of loop circuits based on information associated with the source device and information associated with the target device, wherein the relay resonator comprises:
- a plurality of capacitors respectively corresponding to the plurality of loop circuits; and
- a plurality of first switches respectively corresponding to the plurality of loop circuits and each configured to connect a corresponding one of the plurality of capacitors to a corresponding one of the plurality of loop circuits.

22. The relay device of claim 21, wherein the circuit selector is further configured to control the first switch corresponding to the selected loop circuit to connect the capacitor corresponding to the selected loop circuit to the selected loop circuit to cause the selected loop circuit to relay a magnetic field corresponding to the selected loop circuit.

23. A operating method of a source device transmitting a wireless power to a target device, the source device comprising a source resonator comprising a plurality of loop circuits, the method comprising:
- selecting one loop circuit among the plurality of loop circuits of the source resonator based on information associated with the target device;
- controlling a plurality of first switches based on the information associated with the target device, the plurality of first switches respectively corresponding to the plurality of loop circuits and each configured to connect a corresponding one of a plurality of capacitors to a corresponding one of the plurality of loop circuits; and
- generating a magnetic field corresponding to a length of the selected loop circuit.

24. A non-transitory computer readable storage medium storing a program for controlling a computer to perform the method of claim 23.

25. A operating method of a target device receiving a wireless power from a source device, the target device comprising a target resonator comprising a plurality of loop circuits, the method comprising:
- selecting one loop circuit among the plurality of loop circuits of the target resonator based on information associated with the source device;
- controlling a plurality of first switches based on the information associated with the source device, the plurality of first switches respectively corresponding to the plurality of loop circuits and each configured to connect a corresponding one of a plurality of capacitors to a corresponding one of the plurality of loop circuits; and
- receiving a magnetic field corresponding to a length of the selected loop circuit.

26. A operating method of a relay device relaying a wireless power from a source device to a target device, the relay device comprising a relay resonator comprising a plurality of loop circuits, the method comprising:
- selecting one loop circuit among the plurality of loop circuits of the relay resonator based on information associated with the source device and the target device;
- controlling a plurality of first switches based on the information associated with the source device and the target device, the plurality of first switches respectively corresponding to the plurality of loop circuits and each configured to connect a corresponding one of a plurality of capacitors to a corresponding one of the plurality of loop circuits; and
- relaying a magnetic field corresponding to a length of the selected loop circuit.

* * * * *